(12) United States Patent
Mochizuki

(10) Patent No.: US 12,405,161 B2
(45) Date of Patent: Sep. 2, 2025

(54) SENSOR DEVICE AND READING METHOD

(71) Applicant: SONY SEMICONDUCTOR SOLUTIONS CORPORATION, Kanagawa (JP)

(72) Inventor: Futa Mochizuki, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 469 days.

(21) Appl. No.: 17/798,428

(22) PCT Filed: Jan. 6, 2021

(86) PCT No.: PCT/JP2021/000223
§ 371 (c)(1),
(2) Date: Aug. 9, 2022

(87) PCT Pub. No.: WO2021/166472
PCT Pub. Date: Aug. 26, 2021

(65) Prior Publication Data
US 2023/0071929 A1 Mar. 9, 2023

(30) Foreign Application Priority Data
Feb. 17, 2020 (JP) .................................. 2020-024343

(51) Int. Cl.
*G01J 1/44* (2006.01)
*H04N 25/60* (2023.01)
*H04N 25/779* (2023.01)

(52) U.S. Cl.
CPC ............... *G01J 1/44* (2013.01); *H04N 25/60* (2023.01); *H04N 25/779* (2023.01); *G01J 2001/446* (2013.01)

(58) Field of Classification Search
CPC .. G01J 1/44; G01J 2001/446; G01J 2001/448; H04N 25/60; H04N 25/779;
(Continued)

(56) References Cited

U.S. PATENT DOCUMENTS

2014/0009648 A1* 1/2014 Kim ..................... H04N 25/134
 348/272
2015/0302710 A1* 10/2015 Jin ........................ H10F 39/802
 348/155

(Continued)

FOREIGN PATENT DOCUMENTS

| JP | 2017-050853 A | 3/2017 |
| WO | 2017/009944 A1 | 1/2017 |
| WO | 2017/104438 A1 | 6/2017 |

OTHER PUBLICATIONS

International Search Report and Written Opinion of PCT Application No. PCT/JP2021/000223, issued on Mar. 16, 2021, 08 pages of ISRWO.

Primary Examiner — Lin Ye
Assistant Examiner — Tuan H Le
(74) Attorney, Agent, or Firm — CHIP LAW GROUP

(57) ABSTRACT

A sensor device according to the present technology includes: a pixel array unit in which a plurality of pixel units each having one or a plurality of pixels and capable of generating a gradation signal indicating intensity of a light reception amount and an event signal indicating a change in the light reception amount is two-dimensionally arranged; and a row control unit that can sequentially execute in rows selection of a pixel from which the event signal is to be read and selection of a pixel from which the gradation signal is to be read at different timings.

20 Claims, 36 Drawing Sheets

FIRST EMBODIMENT

(58) Field of Classification Search
CPC ........ H04N 25/47; H04N 23/60; H04N 25/44; H04N 25/57; H04N 25/766; H04N 25/771; H04N 25/778; H04N 25/46; H04N 25/70; H04N 25/78
See application file for complete search history.

(56) References Cited

U.S. PATENT DOCUMENTS

| | | | | |
|---|---|---|---|---|
| 2016/0093273 | A1* | 3/2016 | Wang | G01S 3/781 |
| | | | | 345/428 |
| 2016/0094787 | A1* | 3/2016 | Govil | H10F 39/18 |
| | | | | 348/310 |
| 2017/0059399 | A1* | 3/2017 | Suh | G01J 1/42 |
| 2018/0167575 | A1* | 6/2018 | Watanabe | H04N 25/78 |
| 2018/0348381 | A1* | 12/2018 | Nishihara | H04N 25/78 |
| 2019/0364230 | A1* | 11/2019 | Yeo | H04N 25/709 |
| 2020/0058205 | A1* | 2/2020 | Yaffe | G08B 13/1961 |

* cited by examiner

FIRST EMBODIMENT

SECOND EMBODIMENT

THIRD EMBODIMENT

FOURTH EMBODIMENT

SENSOR DEVICE AND READING METHOD

CROSS REFERENCE TO RELATED APPLICATIONS

This application is a U.S. National Phase of International Patent Application No. PCT/JP2021/000223 filed on Jan. 6, 2021, which claims priority benefit of Japanese Patent Application No. JP 2020-024343 filed in the Japan Patent Office on Feb. 17, 2020. Each of the above-referenced applications is hereby incorporated herein by reference in its entirety.

TECHNICAL FIELD

The present technology relates to a sensor device including a pixel array unit in which a plurality of pixel units each having one or a plurality of pixels and capable of generating a gradation signal indicating intensity of a light reception amount and an event signal indicating a change in the light reception amount is two-dimensionally arranged, and a reading method therein.

BACKGROUND ART

For example, as known as a dynamic vision sensor (DVS) or the like, there is a sensor device that detects an event signal representing a change in a light reception amount for every pixel. In this type of sensor device, there is a sensor device in which a pixel for event signal detection and a pixel for gradation signal detection are mixed so that a gradation signal (signal indicating intensity of a light reception amount) of a pixel in which an event has been detected can be acquired (see, for example, Patent Document 1 below).

CITATION LIST

Patent Document

Patent Document 1: US 2014-9648 A

SUMMARY OF THE INVENTION

Problems to be Solved by the Invention

Here, Patent Document 1 discloses a configuration in which an event signal and a gradation signal are read by an arbiter method for a pixel array unit in which a pixel for event signal (motion) detection and a pixel for gradation signal (color) detection are mixed. However, since the arbiter method is assumed, reading timings of the event signal and the gradation signal are timings according to event detection for the corresponding pixel. Furthermore, Patent Document 1 only discloses that one of the event signal and the gradation signal is selected and output, and reading of the gradation signal and reading of the event signal cannot be performed at the same time for a pixel in which an event has been detected.

The present technology has been made in view of the circumstances described above, and an object thereof is to provide a sensor device capable of simultaneously reading an event signal and a gradation signal.

Solutions to Problems

A sensor device according to the present technology includes: a pixel array unit in which a plurality of pixel units each having one or a plurality of pixels and capable of generating a gradation signal indicating intensity of a light reception amount and an event signal indicating a change in the light reception amount is two-dimensionally arranged; and a row control unit that can sequentially execute in rows selection of a pixel from which the event signal is to be read and selection of a pixel from which the gradation signal is to be read at different timings.

According to the configuration described above, it is possible to read both the event signal and the gradation signal for each target pixel unit within a period of one frame.

In the sensor device according to the present technology described above, it is conceivable to have a configuration in which the pixel unit includes one pixel, and generation of the gradation signal and generation of the event signal are alternatively performed on the basis of a charge generated in a light receiving element included in the pixel.

Therefore, the event signal and the gradation signal can be read in units of pixels.

In the sensor device according to the present technology described above, it is conceivable to have a configuration in which the row control unit performs row selection for reading the event signal and row selection for reading the gradation signal for all pixel rows.

Therefore, it is possible to realize simultaneous reading of the event signal and the gradation signal in units of frame periods for all the pixel units.

In the sensor device according to the present technology described above, it is conceivable to have a configuration in which the row control unit performs row selection for reading the gradation signal on the basis of a determination result of presence or absence of occurrence of an event based on the event signal.

In the sensor device according to the present technology described above, it is conceivable to have a configuration in which the row control unit performs row selection for reading the event signal for all the pixel units, and performs row selection for reading the gradation signal on the basis of a determination result of presence or absence of occurrence of an event based on the event signal read by the row selection.

Therefore, it is possible to read the gradation signal only for the pixel unit in which the occurrence of the event has been recognized on the basis of the determination result of the presence or absence of the occurrence of the event for all the pixel units.

In the sensor device according to the present technology described above, it is conceivable to include a gradation output unit that outputs the gradation signal read from the pixel unit, and that the gradation output unit selectively outputs the gradation signal of the pixel unit in which it is determined that an event has occurred, among the gradation signals read in units of rows by row selection by the row control unit.

Therefore, it is not necessary to perform circuit operation for outputting the gradation signal at a column position where the occurrence of the event is not recognized.

In the sensor device according to the present technology described above, it is conceivable to include a first read determination unit that counts the number of occurrences of an event on the basis of the event signal for a unit pixel region including the pixel unit in a predetermined row, and determines whether or not the gradation signal can be read for the unit pixel region on the basis of the counted number of occurrences of the event.

The unit pixel region means a region including the pixel units of n (n≥1) rows. Normally, an event occurs with a certain number of pixels. Therefore, in a case where the number of occurrences of an event is extremely small, for example, one, it can be estimated that the event has been erroneously detected due to noise. For this reason, by determining whether or not the gradation signal can be read on the basis of the number of occurrences of the event as described above, it is possible to prevent the gradation signal from being read for the unit pixel region in which the event has been erroneously detected due to noise.

In the sensor device according to the present technology described above, it is conceivable to include a second read determination unit that performs object recognition processing based on the event signal for a unit pixel region including the pixel units in a predetermined plurality of rows, and determines whether or not the gradation signal can be read for the unit pixel region on the basis of presence or absence of recognition of an object by the object recognition processing.

Therefore, it is possible to read the gradation signal in a case where the object has been recognized and not to read the gradation signal in a case where the object has not been recognized for the unit pixel region including the predetermined plurality of rows.

In the sensor device according to the present technology described above, it is conceivable to have a configuration in which the first read determination unit performs noise removal processing, which is processing of removing an event estimated to have been erroneously detected due to noise, for the unit pixel region, and determines whether or not the gradation signal can be read for the unit pixel region on the basis of the number of occurrences of the event after the noise removal processing.

Therefore, it is possible to prevent the gradation signal from being read for the unit pixel region in which the occurrence of the event has been erroneously detected due to noise.

In the sensor device according to the present technology described above, it is conceivable to have a configuration in which the row control unit skips the row selection for reading the gradation signal for a row determined not to read the gradation signal.

In the row sequential selection, by skipping the row selection, an interval between selection timing of a row immediately before the skip and selection timing of a row immediately after the skip can be shortened to an interval of one row.

In the sensor device according to the present technology described above, it is conceivable to have a configuration in which the row control unit resets a charge of a light receiving element for all rows regardless of whether or not the gradation signal is read.

Therefore, the charge of the light receiving element can be periodically reset in a frame period.

In the sensor device according to the present technology described above, it is conceivable to have a configuration in which the pixel unit can generate, as the event signal, a first polarity event signal indicating a change on an increasing side of the light reception amount and a second polarity event signal indicating a change on a decreasing side of the light reception amount.

Therefore, it is possible to identify whether a generated event is an event on the increasing side or an event on the decreasing side of the light reception amount.

In the sensor device according to the present technology described above, it is conceivable to have a configuration in which the row control unit changes charge accumulation time related to generation of the gradation signal according to the polarity of the event signal.

Since the first polarity event is the event on the side in which the light reception amount increases, it is sufficient if the charge accumulation time of the gradation signal is short. Conversely, since the second polarity event is the event on the side in which the light reception amount decreases, it is desirable to increase the charge accumulation time of the gradation signal.

In the sensor device according to the present technology described above, it is conceivable to have a configuration in which the row control unit performs row selection for reading the event signal before starting charge accumulation related to generation of the gradation signal.

By performing the row selection for reading the event signal before starting the charge accumulation, it is possible to determine whether or not the gradation signal of the row can be read on the basis of the event signal before starting the charge accumulation.

In the sensor device according to the present technology described above, it is conceivable to have a configuration in which the row control unit performs row selection for reading the event signal during an execution period of charge accumulation related to generation of the gradation signal.

Therefore, as compared with a case where reading of the event signal is performed before starting the charge accumulation, it is possible to read the event signal at timing closer to a time point at which reading of the gradation signal is started. For example, reading of the event signal can be performed immediately before reading of the gradation signal, and the like.

In the sensor device according to the present technology described above, it is conceivable to have a configuration in which the row control unit starts charge accumulation related to generation of the gradation signal simultaneously for all the pixel units.

Therefore, it is not necessary to perform independent timing control in units of rows for charge accumulation of the gradation signal.

In the sensor device according to the present technology described above, it is conceivable to have a configuration in which each of the pixel units outputs the generated event signal to the row control unit, and the row control unit determines a row from which the gradation signal is to be read on the basis of the event signal input from each of the pixel units.

Therefore, it is possible to determine which row is to be the row from which the gradation signal is to be read before the event signals of all the pixel units are sequentially read in rows.

In the sensor device according to the present technology described above, it is conceivable to have a configuration in which the row control unit sequentially performs row selection for reading the gradation signal in rows for the row determined to be read.

Therefore, even in a case where an event has occurred in the plurality of pixel units, the gradation signal of each of the pixel units is not read at random at each event occurrence timing, but is sequentially read in rows.

In the sensor device according to the present technology described above, it is conceivable to have a configuration in which the pixel unit includes a pixel that generates the event signal and a pixel that generates the gradation signal.

In this case, the pixel unit generates the event signal and the gradation signal in different pixels.

Furthermore, a reading method according to the present technology is a reading method in a sensor device including a pixel array unit in which a plurality of pixel units each having one or a plurality of pixels and capable of generating a gradation signal indicating intensity of a light reception amount and an event signal indicating a change in the light reception amount is two-dimensionally arranged, the reading method including: sequentially executing in rows selection of a pixel from which the event signal is to be read and selection of a pixel from which the gradation signal is to be read at different timings.

By such a reading method as well, effects similar to those of the sensor device according to the present technology described above can be obtained.

MODES FOR CARRYING OUT THE INVENTION

Hereinafter, embodiments according to the present technology will be described in the following order with reference to the accompanying drawings.

<1. First Embodiment>
[1-1. Configuration of Sensor Device]
[1-2. Configuration of Pixel Array Unit]
[1-3. Reading Method as First Embodiment]

<2. Second Embodiment>
<3. Third Embodiment>
<4. Fourth Embodiment>
<5. Fifth Embodiment>
<6. Sixth Embodiment>
<7. Modifications>
<8. Summary of Embodiments>
<9. Present Technology>

1. First Embodiment

[1-1. Configuration of Sensor Device]

Figure 1:
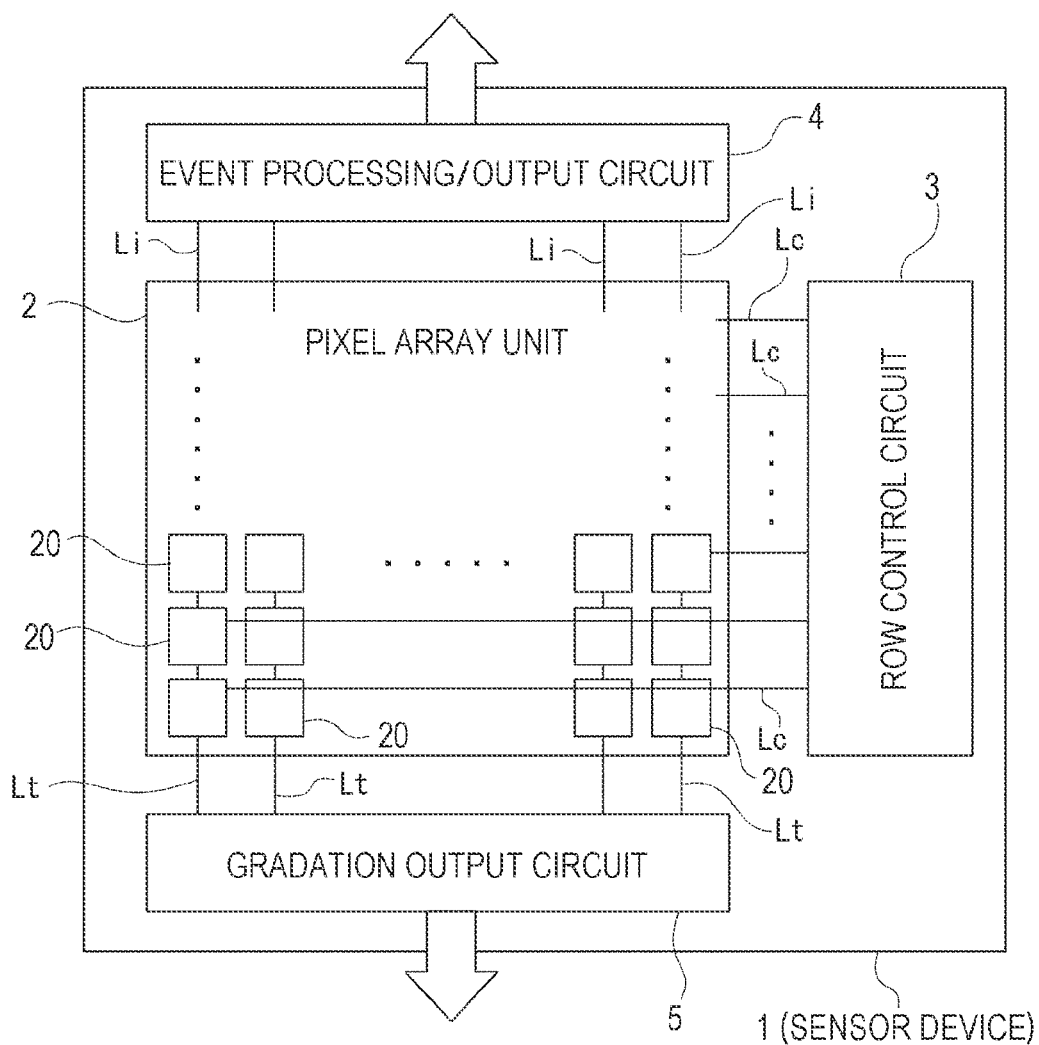
FIG. 1 is a block diagram illustrating an internal configuration example of a sensor device as a first embodiment according to the present technology.

FIG. 1 is a block diagram illustrating an internal configuration example of a sensor device 1 as a first embodiment according to the present technology.

As illustrated, the sensor device 1 includes a pixel array unit 2, a row control circuit 3, an event processing/output circuit 4, and a gradation output circuit 5.

The pixel array unit 2 has a configuration in which a plurality of pixel units 20 is two-dimensionally arranged in a matrix in a row direction and a column direction. Here, the row direction refers to a pixel arrangement direction in a horizontal direction, and the column direction refers to a pixel arrangement direction in a vertical direction. In the drawing, the row direction is a lateral direction, and the column direction is a longitudinal direction.

Each pixel unit 20 includes one or a plurality of pixels, and is capable of generating a gradation signal indicating intensity of a light reception amount and an event signal indicating a change in the light reception amount. The pixel unit 20 of the present example has a single pixel as a pixel 21 as described later, and the pixel 21 is configured to be able to generate a gradation signal and an event signal. This point will be described later.

In the pixel array unit 2, a row control line Lc is wired along the row direction for every pixel row, and an event vertical signal line Li and a gradation vertical signal line Lt are wired along the column direction for each pixel column with respect to the matrix-like pixel arrangement.

The row control line Lc transmits various signals for performing driving when a signal is read from a pixel in the pixel unit 20. Note that each row control line Lc is illustrated as one wiring line for convenience of illustration in FIG. 1, but each row control line Lc is configured with a plurality of wiring lines as described later. One end of each row control line Lc is connected to an output end corresponding to each row of the row control circuit 3.

The row control circuit 3 includes, for example, a timing generator that generates various timing signals, a shift register, an address decoder, and the like, and drives each pixel unit 20 in the pixel array unit 2 by outputting various signals through the row control line Lc, and controls generation and reading of an event signal and generation and reading of a gradation signal.

Note that a driving method of the pixel unit 20 in the present embodiment will be described again later.

The event vertical signal line Li is a wiring line for transmitting an event signal read from the pixel unit 20 to the event processing/output circuit 4, and one end of each event vertical signal line Li is connected to an output end corresponding to each column of the event processing/output circuit 4.

The event processing/output circuit 4 acquires an event signal read from each pixel unit 20 through the event vertical signal line Li, performs predetermined signal processing, and outputs the signal.

The gradation vertical signal line Lt is a wiring line for transmitting a gradation signal read from the pixel unit 20 to the gradation output circuit 5, and one end of each gradation vertical signal line Lt is connected to an output end corresponding to each column of the gradation output circuit 5.

The gradation output circuit 5 receives a gradation signal read from each pixel unit 20 through the gradation vertical signal line Lt, performs predetermined signal processing such as analog to digital (A/D) conversion processing, for example, and outputs the signal.

[1-2. Configuration of Pixel Array Unit]

Figure 2:
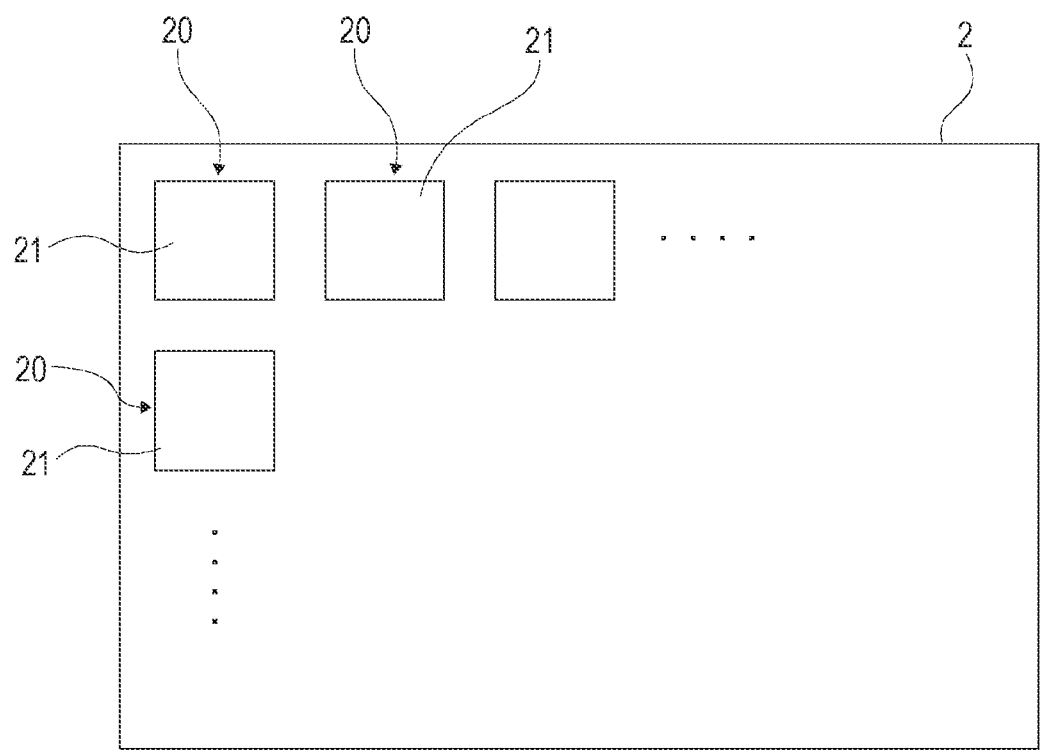
FIG. 2 is an explanatory diagram of a pixel arrangement example in a pixel array unit.

FIG. 2 is an explanatory diagram of a pixel arrangement example in the pixel array unit 2.

As illustrated, in the pixel array unit 2 of the present example, the pixel units 20 each including the single pixel 21 are two-dimensionally arranged in a matrix.

Each pixel 21 includes a single photodiode PD, and is configured to be able to alternatively generate a gradation signal and an event signal using a charge obtained in the photodiode PD.

Figure 3:
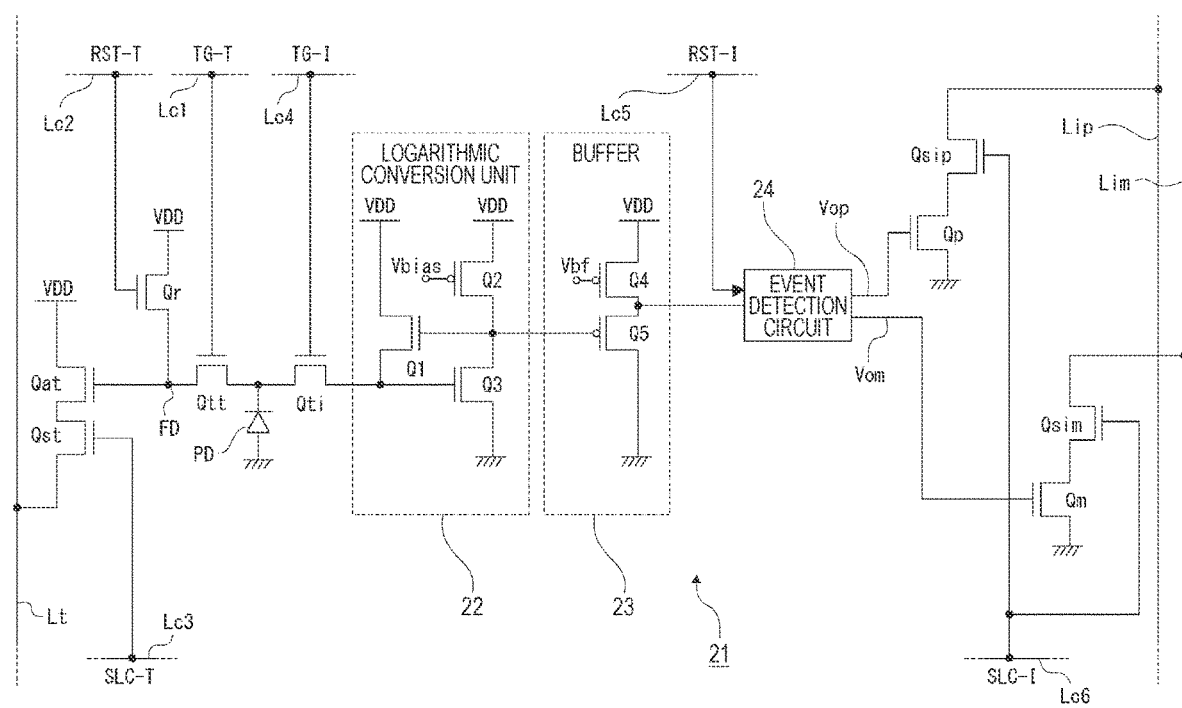
FIG. 3 is an equivalent circuit diagram of a pixel according to the embodiment.

FIG. 3 is an equivalent circuit diagram of the pixel 21.

As illustrated, the pixel 21 includes the photodiode PD as a photoelectric conversion element. Then, the pixel 21 includes a gradation transfer transistor Qtt, a floating diffusion FD, a reset transistor Qr, an amplification transistor Qat, and a gradation selection transistor Qst as a configuration related to generation and reading of a gradation signal.

Furthermore, the pixel 21 includes an event transfer transistor Qti, a logarithmic conversion unit 22, a buffer 23, an event detection circuit 24, a transistor Qp, a first event selection transistor Qsip, a transistor Qm, and a second event selection transistor Qsim as a configuration related to generation and reading of an event signal.

Here, in the present example, the various transistors included in the pixel 21 include, for example, metal-oxide-semiconductor field-effect transistors (MOSFETs).

Furthermore, a row control line Lc1 for transmitting a gradation transfer drive signal TG-T, a row control line Lc2 for transmitting a charge reset signal RST-T, a row control line Lc3 for transmitting a gradation selection signal SLC-T, a row control line Lc4 for transmitting an event transfer drive signal TG-I, a row control line Lc5 for transmitting a reference level reset signal RST-I, and a row control line Lc6 for transmitting an event selection signal SLC-I are wired to the pixel 21 as the above-described row control lines Lc.

First, the configuration related to generation and reading of the gradation signal will be described.

The gradation transfer transistor Qtt has a gate connected to the row control line Lc1, becomes conductive when the gradation transfer drive signal TG-T supplied from the row control line Lc1 is turned on, and transfers a signal charge accumulated in the photodiode PD to the floating diffusion FD.

The floating diffusion FD is a charge holding unit that temporarily holds the charge transferred from the photodiode PD.

The reset transistor Qr has a gate connected to the row control line Lc2, and becomes conductive when the charge reset signal RST-T supplied from the row control line Lc2 is turned on, and resets potential of the floating diffusion FD to reference potential VDD.

A source of the amplification transistor Qat is connected to the gradation vertical signal line Lt via the gradation selection transistor Qst, and a drain thereof is connected to the reference potential VDD (constant current source), thereby constituting a source follower circuit.

The gradation selection transistor Qst is connected between the source of the amplification transistor Qat and the gradation vertical signal line Lt, and has a gate connected to the row control line Lc3. The gradation selection transistor Qst becomes conductive when the gradation selection signal SLC-T supplied from the row control line Lc3 to the gate is turned on, and outputs the charge held in the floating diffusion FD to the gradation vertical signal line Lt via the amplification transistor Qat.

Operation of the pixel 21 related to generation and reading of the gradation signal will be briefly described.

Note that, as a premise, the event transfer transistor Qti is in an off state from a start of generation of the gradation signal to reading thereof.

First, charge reset operation (electronic shutter operation) for resetting a charge of the pixel 21 is performed before light reception is started. That is, the reset transistor Qr and the gradation transfer transistor Qtt are turned on (conductive), and accumulated charges in the photodiode PD and the floating diffusion FD are reset.

After resetting the accumulated charges, the reset transistor Qr and the gradation transfer transistor Qtt are turned off to start charge accumulation in the photodiode PD. Thereafter, when a charge signal accumulated in the photodiode PD is read, the gradation transfer transistor Qtt is turned on, and the gradation selection transistor Qst is turned on. Therefore, the charge signal is transferred from the photodiode PD to the floating diffusion FD, and a charge signal held in the floating diffusion FD is output to the gradation vertical signal line Lt via the amplification transistor Qat.

The configuration related to generation and reading of the event signal will be described.

The event transfer transistor Qti has a gate connected to the row control line Lc4, becomes conductive when the event transfer drive signal TG-I supplied from the row control line Lc4 is turned on, and transfers a charge accumulated in the photodiode PD to the logarithmic conversion unit 22.

The logarithmic conversion unit 22 converts a photocurrent (current corresponding to a light reception amount) obtained from the photodiode PD into a voltage signal of a logarithm thereof.

The buffer 23 corrects the voltage signal input from the logarithmic conversion unit 22 and outputs the corrected voltage signal to the event detection circuit 24.

As illustrated, the logarithmic conversion unit 22 includes a transistor Q1, a transistor Q2, and a transistor Q3. In the present example, the transistors Q1 and Q3 are N-type transistors, and the transistor Q2 is a P-type transistor.

A source of the transistor Q1 is connected to a cathode of the photodiode PD via the event transfer transistor Qti, and a drain thereof is connected to the power supply terminal (reference potential VDD).

The transistor Q2 and the transistor Q3 are connected in series between the power supply terminal and a ground terminal. Furthermore, a connection point between the transistor Q2 and the transistor Q3 is connected to a gate of the transistor Q1 and an input terminal of the buffer 23 (a gate of a transistor Q5 as described later). Furthermore, a predetermined bias voltage Vbias is applied to a gate of the transistor Q2.

Drains of the transistor Q1 and the transistor Q3 are connected to a power supply side (reference potential VDD), and a source follower circuit is formed. The photocurrent from the photodiode PD is converted into a voltage signal of the logarithm by these two source followers connected in a loop shape. Furthermore, the transistor Q2 supplies a constant current to the transistor Q3.

The buffer 23 includes a transistor Q4 and a transistor Q5 which are P-type transistors, and these transistors Q4 and Q5 are connected in series between the power supply terminal and the ground terminal.

A connection point between the transistor Q4 and the transistor Q5 is set as an output terminal of the buffer 23, and a corrected voltage signal is output from the output terminal to the event detection circuit 24 as a light reception signal.

The event detection circuit 24 detects a change in a light reception amount as an event by obtaining a difference from a current level of the light reception signal using a past level of the light reception signal as a reference level Lref. Specifically, the event detection circuit 24 detects presence or absence of an event on the basis of whether or not a level (an absolute value) of a difference signal representing a difference between the reference level Lref and the current level of the light reception signal is equal to or larger than a predetermined threshold.

The event detection circuit 24 of the present example is configured to be able to separately detect an event in which the light reception amount changes to an increasing side, that is, an event in which the difference from the reference level Lref becomes positive (hereinafter referred to as a "first polarity event") and an event in which the light reception amount changes to a decreasing side, that is, an event in which the difference from the reference level Lref becomes negative (hereinafter referred to as a "second polarity event").

The event detection circuit 24 outputs a signal indicating a detection result of the first polarity event as a first polarity event signal Vop, and outputs a signal indicating a detection result of the second polarity event as a second polarity event signal Vom.

Here, the event detection circuit 24 resets the reference level Lref to the current level of the light reception signal on the basis of the reference level reset signal RST-I input via the row control line Lc5.

By resetting the reference level Lref in such a manner, it is possible to detect a new event on the basis of a change in the light reception signal level from a time point when the reset is performed. That is, resetting of the reference level Lref functions as processing for controlling the event detection circuit 24 to a state in which a new event can be detected.

Note that an internal circuit configuration example of the event detection circuit 24 will be described again.

The transistor Qp and the first event selection transistor Qsip, and the transistor Qm and the second event selection transistor Qsim function as selection output circuits for the first polarity event signal Vop and the second polarity event signal Vom, respectively.

Here, in the present example, a first event vertical signal line Lip and a second event vertical signal line Lim are provided as the event vertical signal lines Li from a relationship of detecting the first polarity event signal Vop and the second polarity event signal Vom as the event signals.

As illustrated, the transistor Qp and the first event selection transistor Qsip are connected in series between the first event vertical signal line Lip and the ground terminal, and the first polarity event signal Vop is supplied to a gate of the transistor Qp.

Furthermore, the transistor Qm and the second event selection transistor Qsim are connected in series between the second event vertical signal line Lim and the ground terminal, and the second polarity event signal Vom is supplied to a gate of the transistor Qm.

A gate of the first event selection transistor Qsip and a gate of the second event selection transistor Qsim are connected to the row control line Lc6, respectively.

The first event selection transistor Qsip is brought into conduction when the event selection signal SLC-I supplied from the row control line Lc6 to the gate is turned on, and outputs the first polarity event signal Vop to the first event vertical signal line Lip.

The second event selection transistor Qsim is brought into conduction when the event selection signal SLC-I supplied from the row control line Lc6 to the gate is turned on, and outputs the second polarity event signal Vom to the second event vertical signal line Lim.

In the pixel 21, in a period different from the period from the start of generation of the gradation signal to the reading thereof, the event transfer drive signal TG-I is turned on, the light reception signal corresponding to the accumulated charge of the photodiode PD is input to the event detection circuit 24, and the first polarity event signal Vop and the second polarity event signal Vom are generated. When the first polarity event signal Vop and the second polarity event signal Vom are read, the event selection signal SLC-I is turned on, and the first polarity event signal Vop and the second polarity event signal Vom are output to the first event vertical signal line Lip and the second event vertical signal line Lim, respectively.

Figure 4:
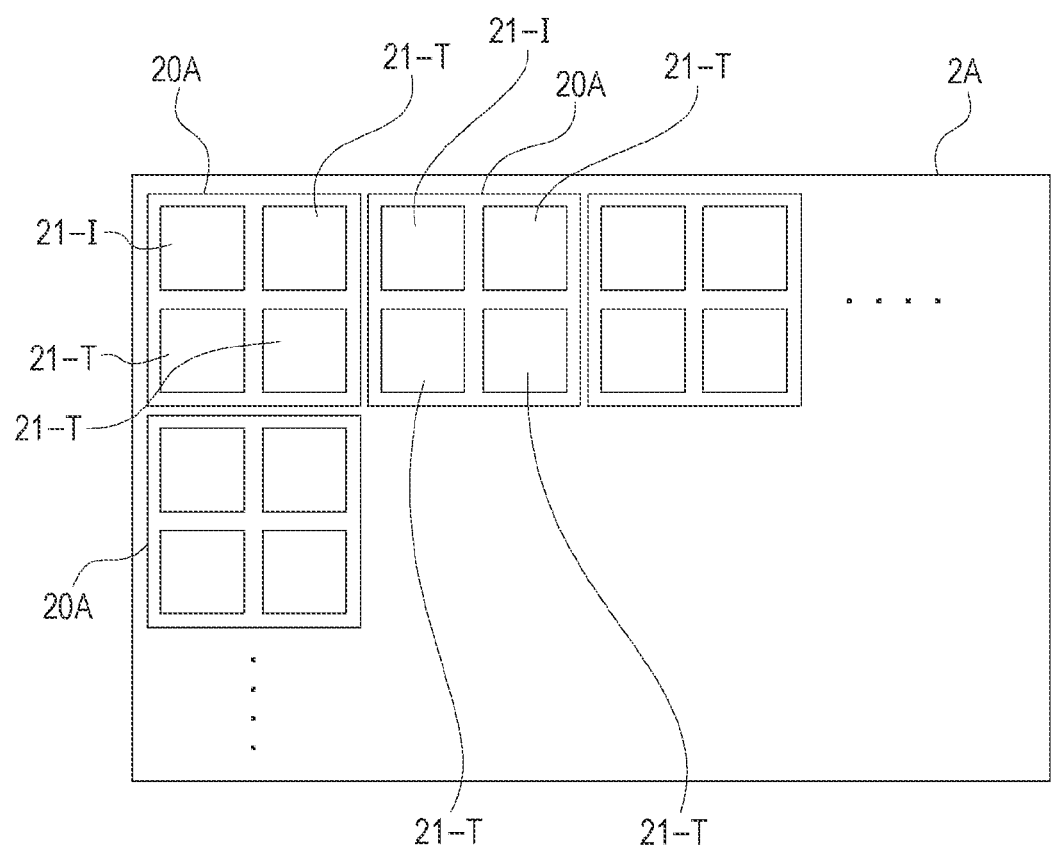
FIG. 4 is an explanatory diagram of a modification of a pixel unit.

Note that, regarding the "pixel unit", as a configuration that can generate both the gradation signal and the event signal, a configuration in which a pixel 21-T that generates the gradation signal and a pixel 21-I that generates the event signal are mixed as illustrated in FIG. 4 can be adopted instead of using the single pixel that can generate both the gradation signal and the event signal as in the pixel 21 described above.

Hereinafter, a pixel unit that can generate both the gradation signal and the event signal by including the pixel 21-T that generates the gradation signal and the pixel 21-I that generates the event signal in this manner will be referred to as a "pixel unit 20A". Furthermore, a pixel array unit in which the pixel units 20A are two-dimensionally arranged in a matrix is referred to as a "pixel array unit 2A".

FIG. 4 illustrates an example in which the pixel unit 20A includes 2×2=4 pixels, one of which is the pixel 21-I and the remaining three are the pixels 21-T, and the pixel 21-I is arranged at an upper left position in the pixel unit 20A. However, the number of pixels 21-I and pixels 21-T constituting the pixel unit 20A and an arrangement pattern of the pixels 21-I and pixels 21-T in the pixel unit 20A are not limited thereto.

Figure 5:
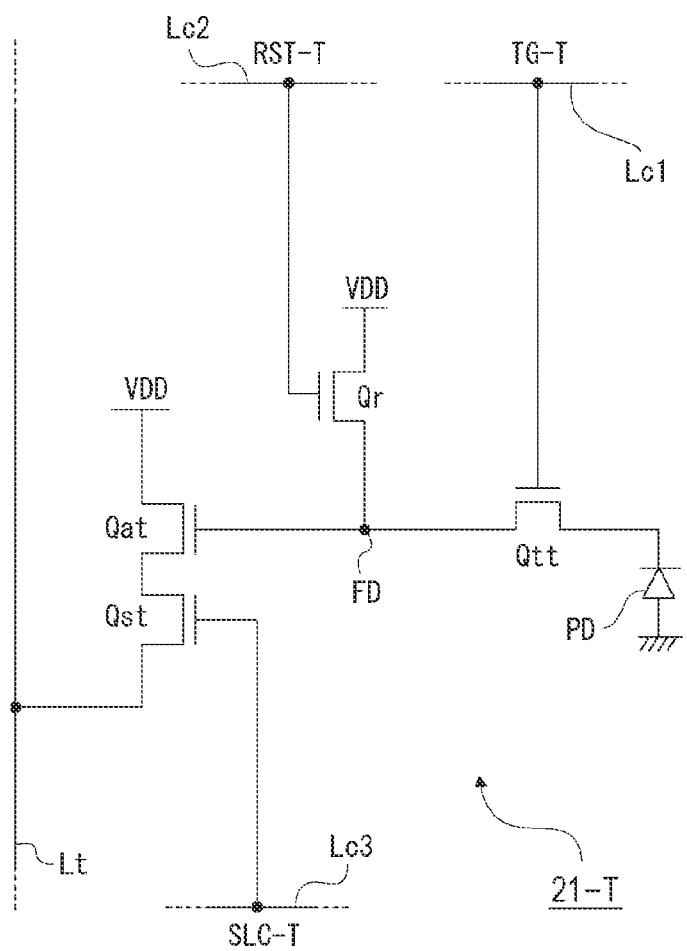
FIG. 5 is an equivalent circuit diagram of one pixel (pixel for generating a gradation signal) of two types of pixels included in the pixel unit as the modification.
Figure 6:
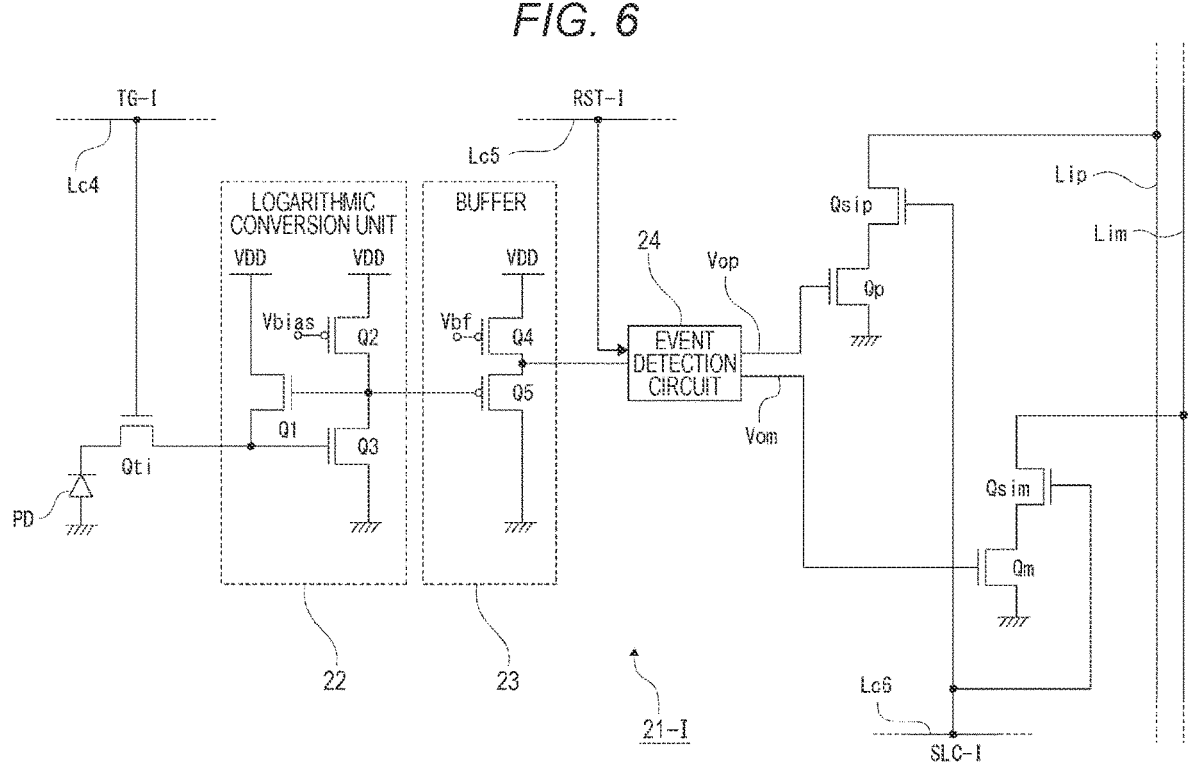
FIG. 6 is an equivalent circuit diagram of another pixel (pixel for generating an event signal) of the two types of pixels included in the pixel unit as the modification.

FIG. 5 is an equivalent circuit diagram of the pixel 21-T, and FIG. 6 is an equivalent circuit diagram of the pixel 21-I.

As can be seen from comparison with FIG. 3 above, an equivalent circuit configuration of the pixel 21-T is similar to that described as the configuration related to generation and reading of the gradation signal in FIG. 3, and the equivalent circuit configuration of the pixel 21-I is similar to that described as the configuration related to generation and reading of the event signal.

Note that, in a case of the arrangement pattern of the pixel 21-T and the pixel 21-I illustrated in FIG. 4, the row control lines Lc1, Lc2, and Lc3 related to generation and reading of the gradation signal are wired for each pixel row in the pixel array unit 2A, and the row control lines Lc4, Lc5, and Lc6 related to generation and reading of the event signal are only required to be wired every other row.

Here, the pixel unit 20A can have a configuration in which the pixel 21 is arranged instead of the pixel 21-I. Therefore, it is possible to generate and read the gradation signal also at an arrangement position of the pixel 21-I.

Furthermore, the pixel unit 20A can have a configuration in which the pixels 21 are arranged at all pixel positions. In that case, by drive control of the pixels 21, a predetermined number of pixels 21 in the pixel unit 20A are caused to function as pixels for generating and reading the gradation signal, and the remaining pixels 21 are caused to function as pixels for generating and reading the event signal.

Figure 7:
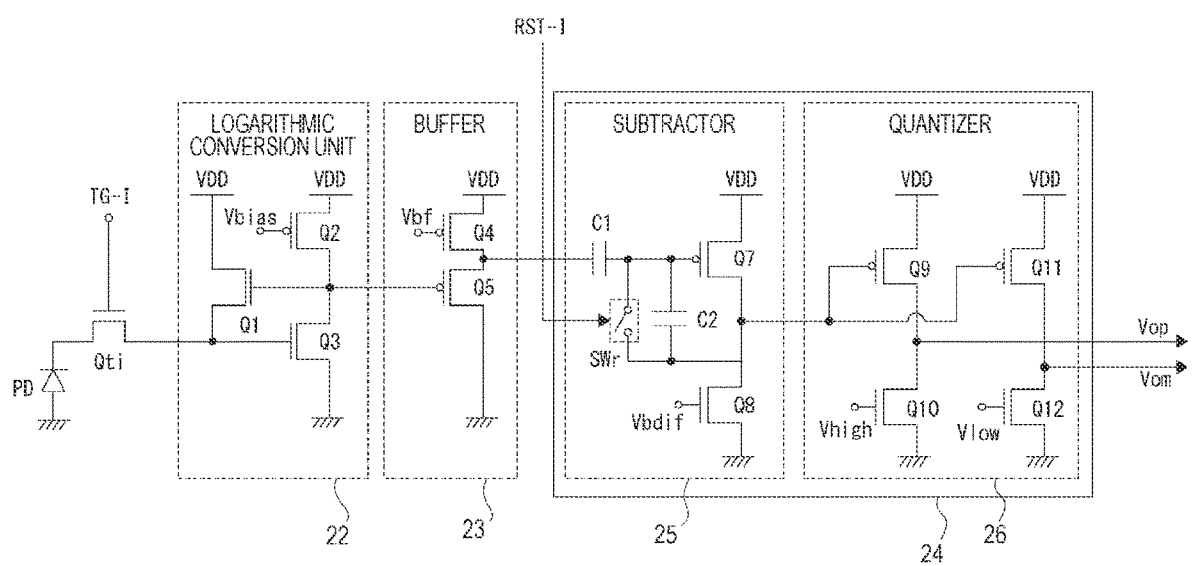
FIG. 7 is an explanatory diagram of an internal configuration example of an event detection circuit.

FIG. 7 is an explanatory diagram of an internal configuration example of the event detection circuit 24, and illustrates the photodiode PD, the logarithmic conversion unit 22, and the buffer 23 together with an internal circuit configuration example of the event detection circuit 24.

As illustrated, the event detection circuit 24 includes a subtractor 25 and a quantizer 26.

The subtractor 25 reduces a level of the light reception signal (voltage signal) from the buffer 23 in accordance with the reference level reset signal RST-I. The subtractor 25 outputs the reduced light reception signal to the quantizer 26.

The quantizer 26 quantizes the light reception signal from the subtractor 25 into a digital signal and outputs the digital signal as an event signal (in the present example, the first polarity event signal Vop and the second polarity event signal Vom).

The subtractor 25 includes a capacitor C1 and a capacitor C2, a transistor Q7 and a transistor Q8, and a reset switch SWr. The transistor Q7 is a P-type transistor, and the transistor Q8 is an N-type transistor.

The transistor Q7 and the transistor Q8 are connected in series between the power supply terminal and the ground terminal, and constitute an inverter. Specifically, a source of the transistor Q7 is connected to the power supply terminal, a drain thereof is connected to a drain of the transistor Q8, and a source of the transistor Q8 is connected to the ground terminal. Note that a voltage Vbdif is applied to a gate of the transistor Q8.

The capacitor C1 has one end connected to the output terminal of the buffer 23 and another end connected to a gate of the transistor Q7 (an input terminal of the inverter). The capacitor C2 has one end connected to the other end of the capacitor C1 and another end connected to a connection point between the transistor Q7 and the transistor Q8.

The reset switch SWr has one end connected to a connection point between the capacitor C1 and the capacitor C2, and another end connected to the connection point between the transistor Q7 and the transistor Q8 and a connection point with the capacitor C2, and is connected in parallel to the capacitor C2. The reset switch SWr is a switch that is turned on/off in accordance with the reference level reset signal RST-I.

The inverter including the transistor Q7 and the transistor Q8 inverts the light reception signal input via the capacitor C1 and outputs the inverted light reception signal to the quantizer 26.

Here, in the subtractor 25, a potential generated on the buffer 23 side of the capacitor C1 at a certain point of time is set as a potential Vinit. Then, it is assumed that the reset switch SWr is turned on at this time. In a case where the reset switch SWr is turned on, a side of the capacitor C1 opposite to the buffer 23 is a virtual ground terminal. A potential of this virtual ground terminal is set to zero for convenience. At this time, when capacitance of the capacitor C1 is Cp1, a charge CHinit accumulated in the capacitor C1 is expressed by the following [Expression 1].

$$CHinit = Cp1 \times Vinit \quad \text{[Expression 1]}$$

Furthermore, when the reset switch SWr is turned on, both ends of the capacitor C2 are short-circuited, so that the accumulated charge becomes zero.

Next, it is assumed that the reset switch SWr is turned off. If there is a change in the light reception amount, the potential on the buffer 23 side of the capacitor C1 is changed from Vinit described above. When a potential after the change is Vafter, a charge CHafter accumulated in the capacitor C1 is represented by the following [Expression 2].

$$CHafter = Cp1 \times Vafter \quad \text{[Expression 2]}$$

On the other hand, when capacitance of the capacitor C2 is Cp2 and an output voltage of the subtractor 25 is Vout, a charge CH2 accumulated in the capacitor C2 is expressed by the following [Expression 3].

$$CH2 = -Cp2 \times Vout \quad \text{[Expression 3]}$$

At this time, since total charge amounts of the capacitors C1 and C2 do not change, the following [Expression 4] holds.

$$CHinit = CHafter + CH2 \quad \text{[Expression 4]}$$

When [Expression 1] to [Expression 3] are substituted into [Expression 4] to be converted, the following [Expression 5] is obtained.

$$Vout = -(Cp1/Cp2) \times (Vafter - Vinit) \quad \text{[Expression 5]}$$

[Expression 5] represents subtraction operation of the voltage signal, and a gain of a subtraction result is Cp1/Cp2.

From this [Expression 5], it can be seen that the subtractor 25 outputs a signal representing a difference between the past level (Vinit) of the light reception signal and the current level (Vafter) of the light reception signal.

Here, the potential Vinit corresponds to the reference level Lref described above. From the description described above, when the reset switch SWr is turned on, this potential Vinit, that is, the reference level Lref is reset to the current level of the light reception signal, in other words, the level of the light reception signal at the time when the reset switch SWr is turned on.

The quantizer 26 includes a transistor Q9, a transistor Q10, a transistor Q11, and a transistor Q12, and is configured as a 1.5 bit quantizer.

The transistors Q9 and Q11 are P-type transistors, and the transistors Q10 and Q12 are N-type transistors.

As illustrated, the transistor Q9 and the transistor Q10, and the transistor Q11 and the transistor Q12 are connected in series between the power supply terminal and the ground terminal, and the output voltage (Vout) of the subtractor 25 is input to each gate of the transistors Q9 and Q11. Furthermore, a voltage Vhigh is applied to a gate of the transistor Q10, and a voltage Vlow is applied to a gate of the transistor Q12.

The first polarity event signal Vop representing the detection result of the first polarity event is obtained at a connection point between the transistor Q9 and the transistor Q10, and the second polarity event signal Vom representing the detection result of the second polarity event is obtained at a connection point between the transistor Q11 and the transistor Q12.

Specifically, on the transistors Q9 and Q10 side, in a case where the level of the output voltage (Vafter-Vinit) of the subtractor 25 is equal to or higher than a positive threshold corresponding to the voltage Vhigh, the first polarity event signal Vop at an H level is obtained at the connection point between the transistor Q9 and the transistor Q10. Furthermore, in a case where the level of the output voltage of the subtractor 25 is lower than the positive threshold, the first polarity event signal Vop at an L level is obtained. That is, at the connection point between the transistor Q9 and the transistor Q10, a signal indicating whether or not the light reception amount has changed by a predetermined threshold or more in an increasing direction, that is, the first polarity event signal Vop indicating the detection result of the first polarity event is obtained.

Furthermore, on the transistors Q11 and Q12 side, in a case where the level of the output voltage of the subtractor 25 is equal to or lower than a negative threshold according to the voltage Vlow, the second polarity event signal Vom at an H level is obtained at the connection point between the transistor Q11 and the transistor Q12. Furthermore, in a case where the level of the output voltage of the subtractor 25 is larger than the negative threshold, the second polarity event signal Vom at an L level is obtained. As described above, at the connection point between the transistor Q11 and the transistor Q12, a signal indicating whether or not the light reception amount has changed by a predetermined threshold or more in a decreasing direction, that is, the second polarity event signal Vom indicating the detection result of the second polarity event is obtained.

[1-3. Reading Method as First Embodiment]

The sensor device 1 of the first embodiment sequentially reads the event signals in rows and sequentially reads the gradation signals in rows for all the pixel units 20.

Here, "all the pixel units" is a concept that means all pixel units formed in an effective pixel region in the pixel array unit 2 and does not include pixel units formed outside the effective pixel region such as a dummy pixel formation region and the like. Note that this point similarly applies to "pixel row" and "pixel column".

Figure 8:
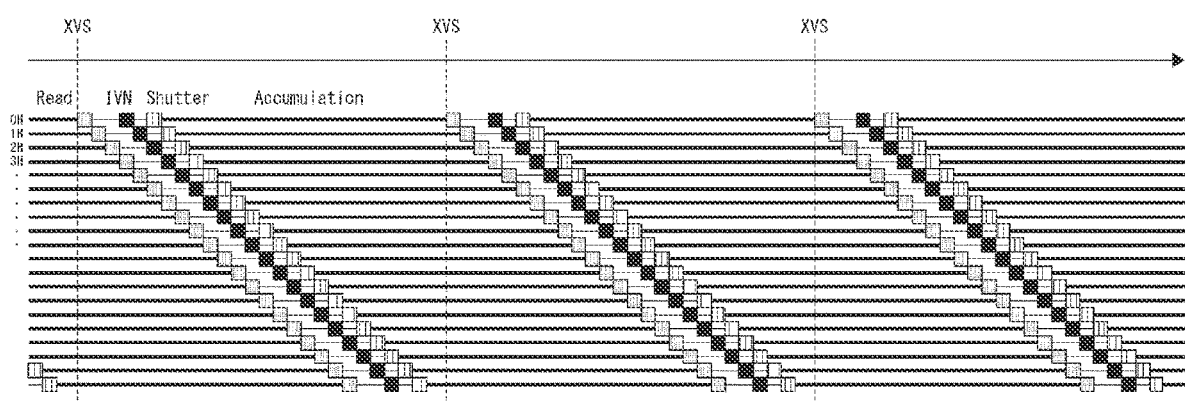
FIG. 8 is a timing chart for explaining a reading method as the first embodiment.

FIG. 8 is a timing chart for explaining a reading method as the first embodiment.

Note that, in each timing chart to be described below including FIG. 8, a gray square with a notation "Read" schematically represents timing of reading the gradation signal. Furthermore, a vertical stripe square with a notation "Shutter" schematically represents timing of electronic shutter operation (charge reset operation) based on the charge reset signal RST-T described above. Moreover, a thick horizontal line with a notation "Accumulation" schematically represents a charge accumulation period for obtaining the gradation signal.

Furthermore, a black square with a notation "IVN" schematically represents execution timing of operation from generation of the event signal (in the present example, the first polarity event signal Vop and the second polarity event signal Vom) to reading thereof.

First, as a premise, row sequential reading of the gradation signal is performed using a vertical synchronization signal XVS as a trigger in the present example. As the operation of generating the gradation signal for every pixel row, first, the reset transistor Qr and the gradation transfer transistor Qtt are turned on to perform electronic shutter operation after a lapse of predetermined time from execution of reading the gradation signal. Thereafter, the reset transistor Qr and the gradation transfer transistor Qtt are turned off to start charge accumulation in the photodiode PD.

At this time, since charge accumulation time for generating the gradation signal is the same in each row, the electronic shutter operation is also sequentially performed in rows similarly to the reading of the gradation signal.

Note that, for confirmation, the reading operation of the gradation signal in each pixel row is executed by the row control circuit 3 turning on the gradation selection signal SLC-T. Furthermore, the electronic shutter operation in each pixel row is realized by the row control circuit 3 turning on the charge reset signal RST-T and the gradation transfer drive signal TG-T, and the charge accumulation is started by turning off the charge reset signal RST-T and the gradation transfer drive signal TG-T.

The event signal generation and reading operation in this case is performed before the electronic shutter operation is started as illustrated in the drawing. In other words, the row control circuit 3 selects a row for reading the event signal before starting charge accumulation related to generation of the gradation signal.

Note that a temporal before-after relationship between the event signal generation and reading operation and the electronic shutter operation herein means a before-after relationship within a period divided by the vertical synchronization signal XVS, that is, a period of one frame, and does not include a before-after relationship with the electronic shutter operation in other frame periods.

Here, the generation operation of the event signal in each pixel row is started by the row control circuit 3 turning on the event transfer drive signal TG-I to turn on the event transfer transistor Qti in a state where the gradation transfer transistor Qtt is turned off by the gradation transfer drive signal TG-T.

Then, the row control circuit 3 turns on the event selection signal SLC-I to turn on the first event selection transistor Qsip and the second event selection transistor Qsim, thereby executing the event signal reading operation.

In the present example, the row control circuit 3 causes the reset switch SWr (see FIG. 7) described above to reset the reference level Lref at timing when the event signal has been read.

Therefore, the event signal in a next frame is generated with the light reception signal level at timing when the event signal in a previous frame has been read as the reference level Lref.

As can be seen with reference to FIG. 8, in the present embodiment, reading of the event signal and reading of the gradation signal are sequentially performed in rows at different timings. In other words, the row control circuit 3 sequentially executes in rows selection of a pixel row from which the event signal is to be read and selection of a pixel row from which the gradation signal is to be read at different timings.

Therefore, both the event signal and the gradation signal can be read from each pixel unit 20 (each pixel 21) within a period of one frame divided by the vertical synchronization signal XVS. That is, simultaneous reading of the event signal and the gradation signal in units of frame periods can be realized.

Note that the simultaneous reading in units of frame periods herein does not necessarily mean that both the event signal and the gradation signal are read within a period divided by the vertical synchronization signal XVS, but means that both the event signal and the gradation signal are read within a period of one frame for every pixel unit 20 from which the gradation signal is to be read. Note that, in a case where the pixel unit 20A is used, a period of one frame may be a period in which a time lag of one row is allowed.

Figure 9:
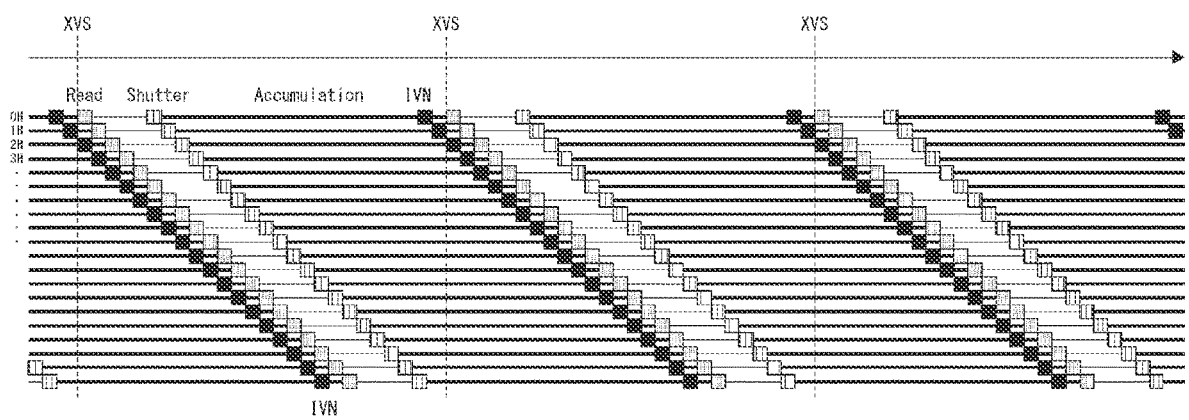
FIG. 9 is a timing chart for an example in which generation and reading of the event signal are performed during an execution period of charge accumulation related to generation of the gradation signal in the first embodiment.

Here, in the above description, the example has been described in which generation and reading of the event signal are performed before start of charge accumulation related to generation of the gradation signal. However, as illustrated in FIG. 9, generation and reading of the event signal can also be performed during an execution period of charge accumulation related to generation of the gradation signal. Specifically, in an example of FIG. 9, generation and reading of the event signal are executed immediately before the end of the execution period of charge accumulation related to generation of the gradation signal. In other words, they are executed at timing immediately before reading the gradation signal.

In the sensor device 1 in this case, the pixel array unit 2A illustrated in FIG. 4 is used instead of the pixel array unit 2. That is, for each pixel unit 20A, generation and reading of the event signal are executed in the pixel 21-I during a period in which charge accumulation related to generation of the gradation signal is performed in the pixel 21-T.

Note that, according to the configuration of the pixel unit 20A illustrated in FIG. 4, a row in which the pixel 21-I exists and a row in which the pixel 21-I does not exist are alternately formed in the pixel array unit 2A. For convenience of illustration, FIG. 9 illustrates timings of gradation signal reading, electronic shutter operation, and event signal generation and reading of each row only for the row in which the pixel 21-I exists.

The row control circuit 3 in this case performs on/off control of the gradation transfer drive signal TG-T, the charge reset signal RST-T, and the gradation selection signal SLC-T so that the gradation signal reading and the electronic shutter operation are similarly performed for the row in which the pixel 21-I does not exist. At this time, the gradation signal reading and the electronic shutter operation are sequentially performed in rows for all rows.

Figure 10:
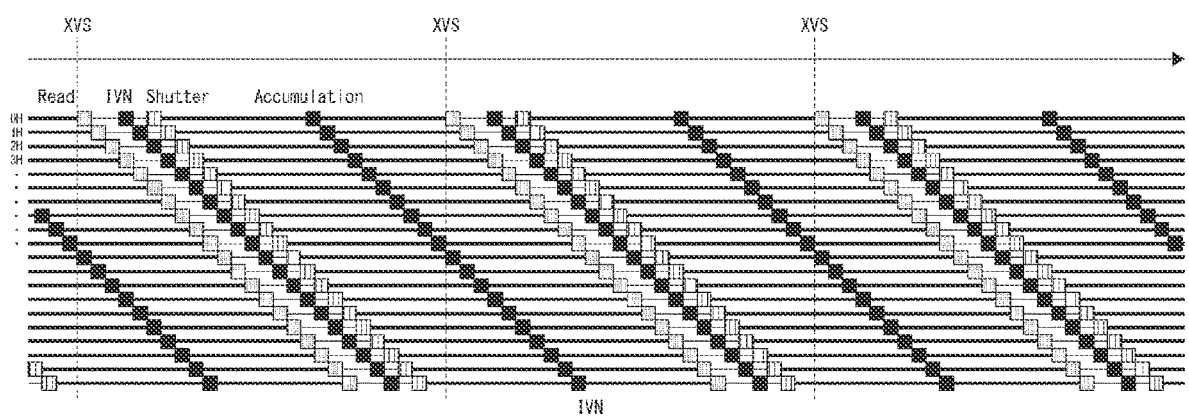
FIG. 10 is a timing chart for an example in which generation and reading of the event signal are performed a plurality of times per frame in the first embodiment.

Furthermore, as illustrated in FIG. 10, generation and reading of the event signal can be performed a plurality of times per frame.

In the example of FIG. 10, the generation and reading of the event signal are performed twice in total before a start of the electronic shutter operation and during an execution period of the charge accumulation related to the generation of the gradation signal for every frame period.

Note that, in a case where the generation and reading of the event signal are performed during the execution period of the charge accumulation related to the generation of the gradation signal, the pixel array unit 2A is used for a purpose similar to the case of FIG. 9.

Figure 11:
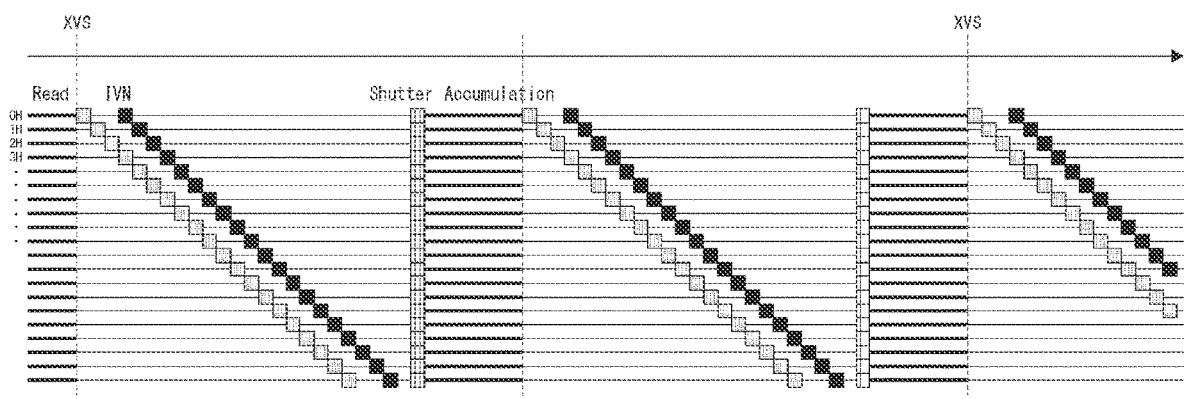
FIG. 11 is a timing chart for an example in which electronic shutter operation is simultaneously executed for all the pixels in the first embodiment.

Note that, in the examples of FIGS. 8 to 10, it is assumed that the electronic shutter operation is sequentially performed in rows, but as illustrated in FIG. 11, electronic shutter operation can be performed simultaneously in all rows as in a so-called global shutter system.

Figure 12:
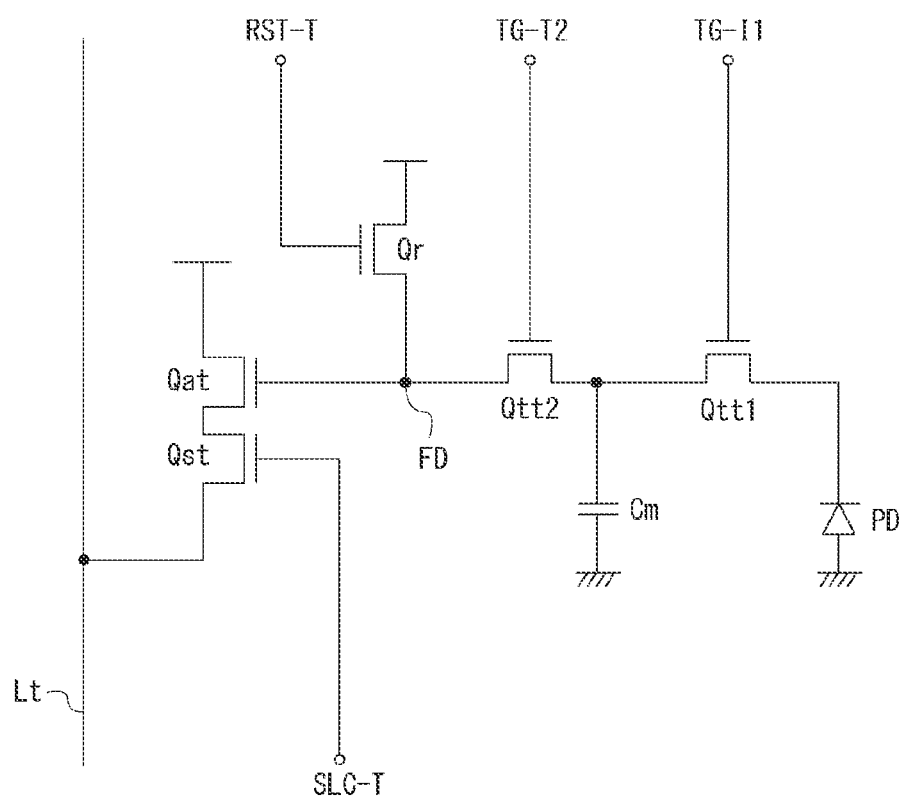
FIG. 12 is an equivalent circuit diagram illustrating an example of a pixel configuration corresponding to a global shutter system.

In this case, for the pixel 21 (or the pixel 21-T) arranged in each row, as exemplified in an equivalent circuit diagram of FIG. 12, two gradation transfer transistors Qtt1 and Qtt2 are provided as the gradation transfer transistor Qtt, and a capacitor Cm (memory) for temporarily holding an accumulated charge of the photodiode PD is provided between the gradation transfer transistors Qtt1 and Qtt2.

In this case, the row control circuit 3 performs on/off control of gradation transfer drive signals TG-I1 and TG-I2 and the charge reset signal RST-T in the drawing, thereby executing the electronic shutter operation. Specifically, the row control circuit 3 first turns on all the gradation transfer drive signals TG-I1 and TG-I2 and the charge reset signal RST-T to turn on all the gradation transfer transistors Qtt1 and Qtt2 and the reset transistor Qr, thereby resetting the charges in the photodiode PD and the capacitor Cm. Thereafter, the gradation transfer drive signals TG-I1 and TG-I2 and the charge reset signal RST-T are all turned off, and the gradation transfer transistors Qtt1 and Qtt2 and the reset transistor Qr are turned off, thereby starting charge accumulation in the photodiode PD.

Then, the row control circuit 3 transfers the accumulated charge in the photodiode PD to the capacitor Cm and causes the capacitor Cm to retain the accumulated charge by turning on and then turning off the gradation transfer drive signal TG-I1 according to a lapse of predetermined charge accumulation time. Moreover, the charge retained in the capacitor Cm is output to the gradation vertical signal line Lt via the floating diffusion FD by turning on the gradation transfer drive signal TG-I2 and the gradation selection signal SLC-T according to arrival of subsequent reading timing of the gradation signal.

2. Second Embodiment

Next, a second embodiment will be described.

In the second embodiment, row selection for reading a gradation signal is performed on the basis of a determination result of presence or absence of occurrence of an event based on an event signal.

Note that, in the following description, the same reference numerals are given to portions similar to those already described, and description thereof is omitted.

Figure 13:
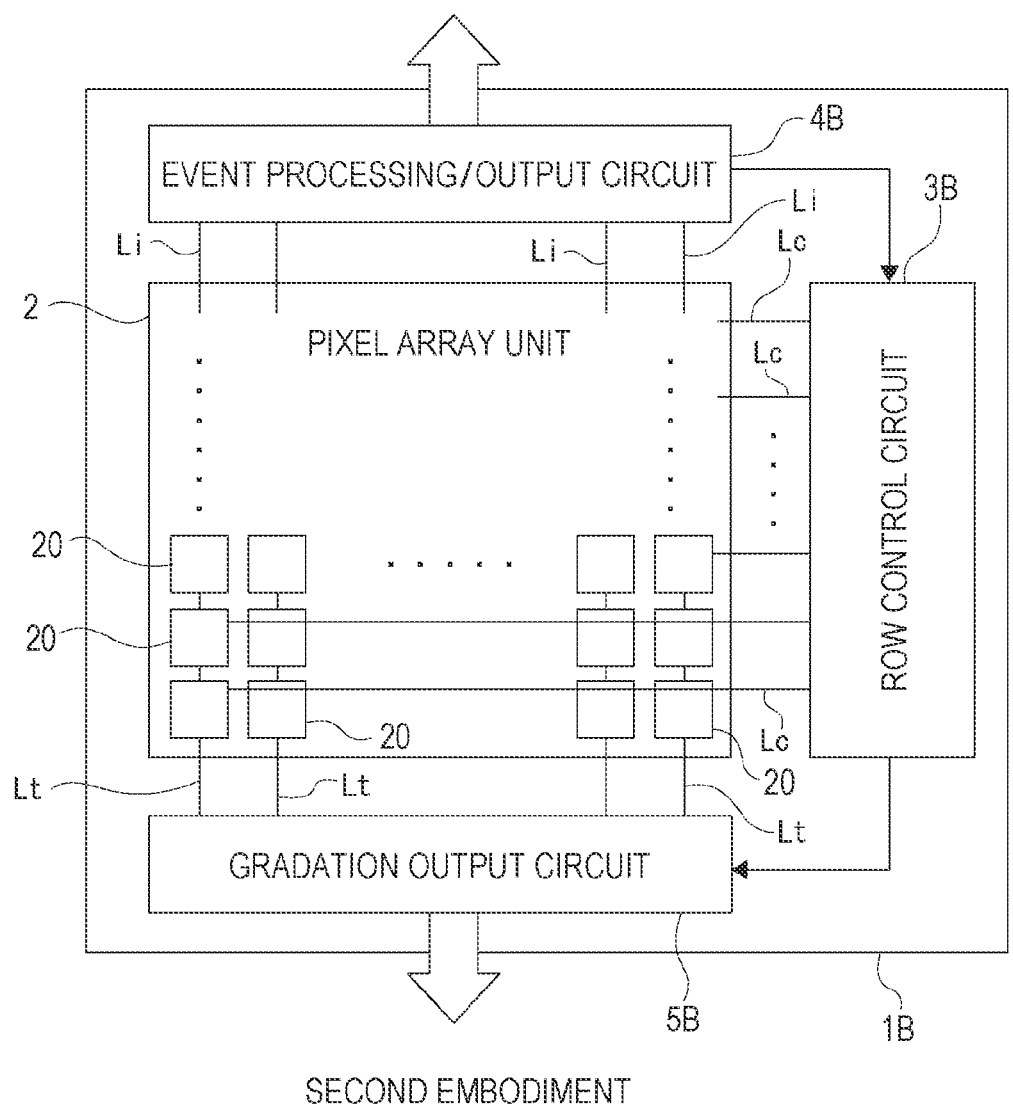
FIG. 13 is a block diagram illustrating an internal configuration example of a sensor device as a second embodiment.

FIG. 13 is a block diagram illustrating an internal configuration example of a sensor device 1B as the second embodiment.

A difference from the sensor device 1 illustrated in FIG. 1 is that a row control circuit 3B, an event processing/output circuit 4B, and a gradation output circuit 5B are provided instead of the row control circuit 3, the event processing/output circuit 4, and the gradation output circuit 5, respectively.

The event processing/output circuit 4B determines, for every row, whether or not an event has occurred on the basis of an event signal sequentially read for every row from the pixel array unit 2, and sequentially outputs an event presence/absence determination signal indicating a determination result to the row control circuit 3B.

On the basis of the event presence/absence determination signal, the row control circuit 3B sequentially causes to execute reading of a gradation signal in rows for only the row in which the event has occurred.

Furthermore, the row control circuit 3B controls the gradation output circuit 5B so as not to execute processing related to gradation signal output for a row in which no event has occurred.

The gradation output circuit 5B is configured to be able to switch whether or not to execute the processing related to the gradation signal output according to an instruction from the row control circuit 3B. Therefore, the row control circuit 3B instructs the gradation output circuit 5B in accordance with output timing of the gradation signal for the row in which the event has not occurred, so that the processing related to the gradation signal output for the row is not performed.

As understood from the above description, the processing related to the gradation signal output includes A/D conversion processing and the like.

Figure 14:
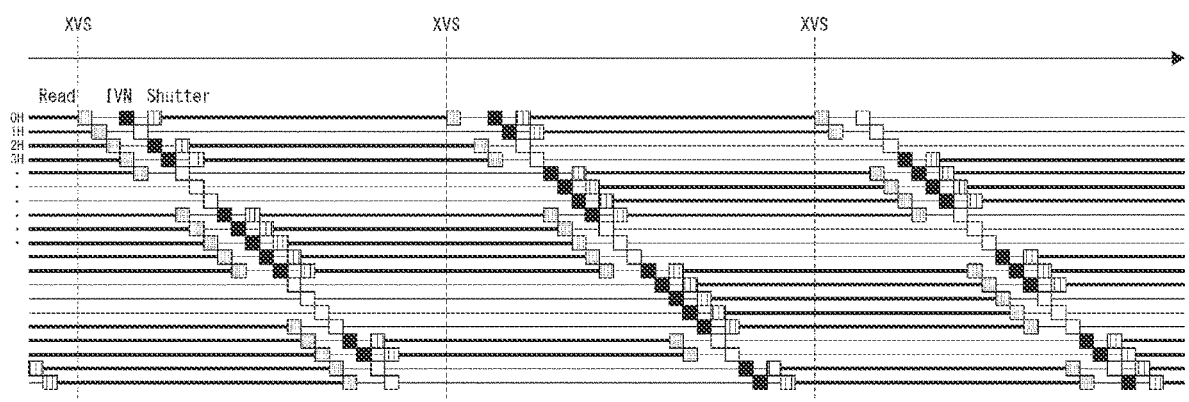
FIG. 14 is a timing chart for explaining a reading method as the second embodiment.

FIG. 14 is a timing chart for explaining a reading method as the second embodiment.

Here, in each timing chart to be described below starting from FIG. 14, a square mark (with a notation "IVN") indicating generation and reading timings of an event signal is written in black in a case of a row in which an event has occurred and in white in a case of a row in which an event has not occurred, thereby distinguishing presence or absence of occurrence of an event in units of rows.

In the example of FIG. 14, similarly to the example of FIG. 9, the generation and reading of the event signal are performed before electronic shutter operation is started.

Furthermore, as illustrated in the drawing, the gradation signal is not read from the row in which the event has not occurred.

Furthermore, in the example of FIG. 14, not only the reading of the gradation signal but also the electronic shutter operation is not executed for the row in which the event has not occurred. That is, for a row in which it is determined that no event has occurred on the basis of the event presence/absence determination signal described above, the row control circuit 3B maintains the above-described gradation transfer drive signal TG-T and charge reset signal RST-T in an off state even if start timing of the electronic shutter operation of the row arrives, thereby preventing the electronic shutter operation from being performed.

Figure 15:
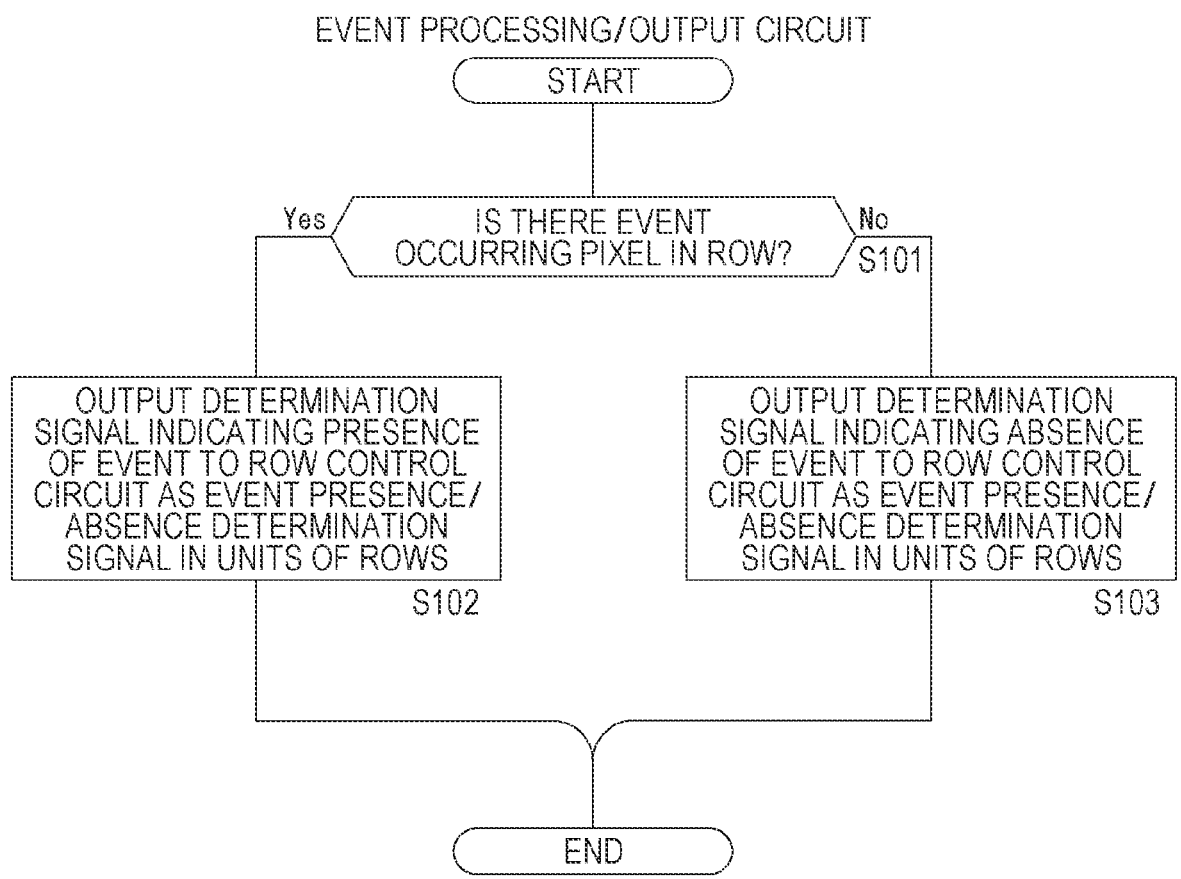
FIG. 15 is a flowchart illustrating an example of a processing procedure of an event processing/output circuit for realizing the reading method as the second embodiment.
Figure 16:
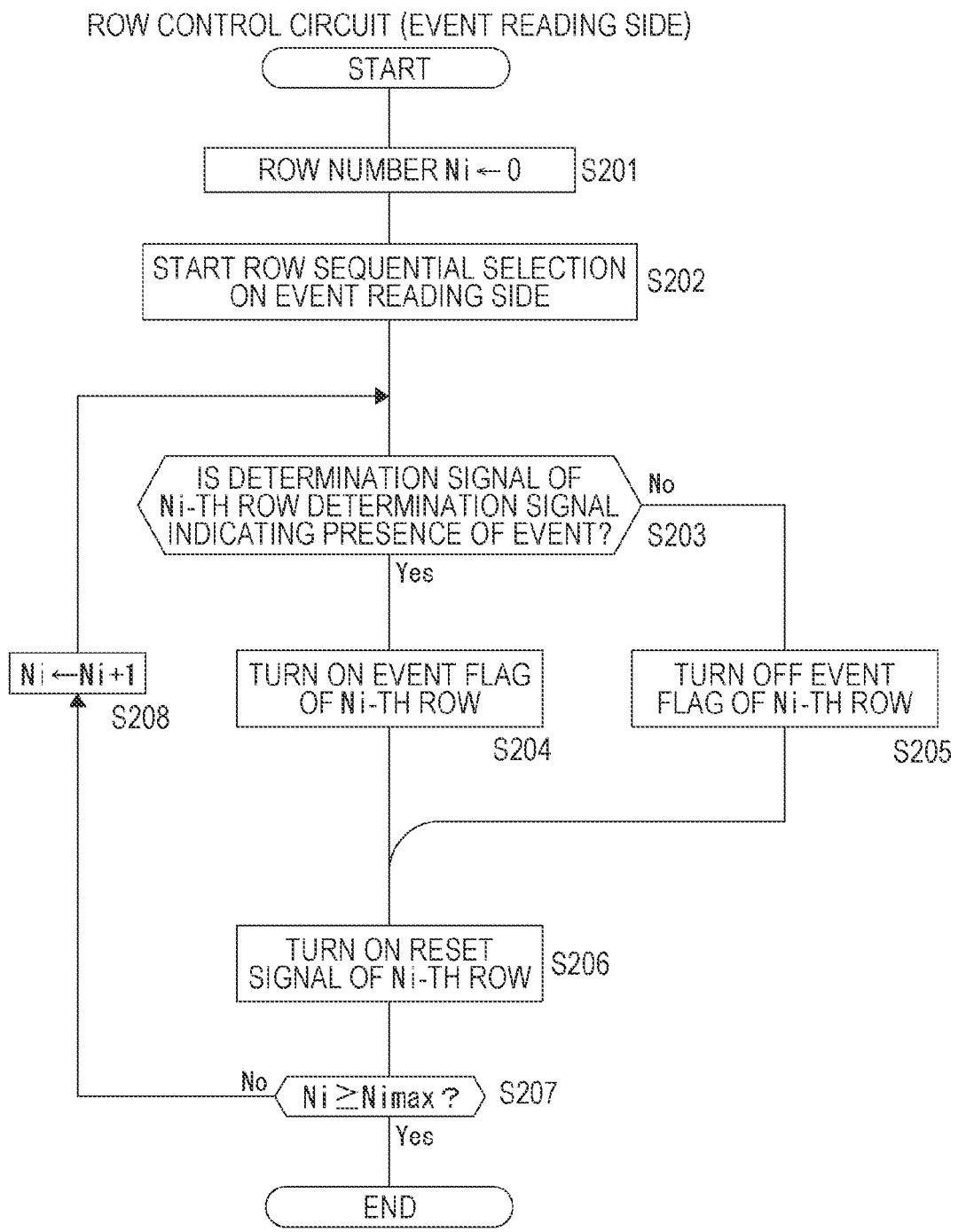
FIG. 16 is a flowchart illustrating an example of a processing procedure of a row control circuit for realizing the reading method as the second embodiment.
Figure 17:
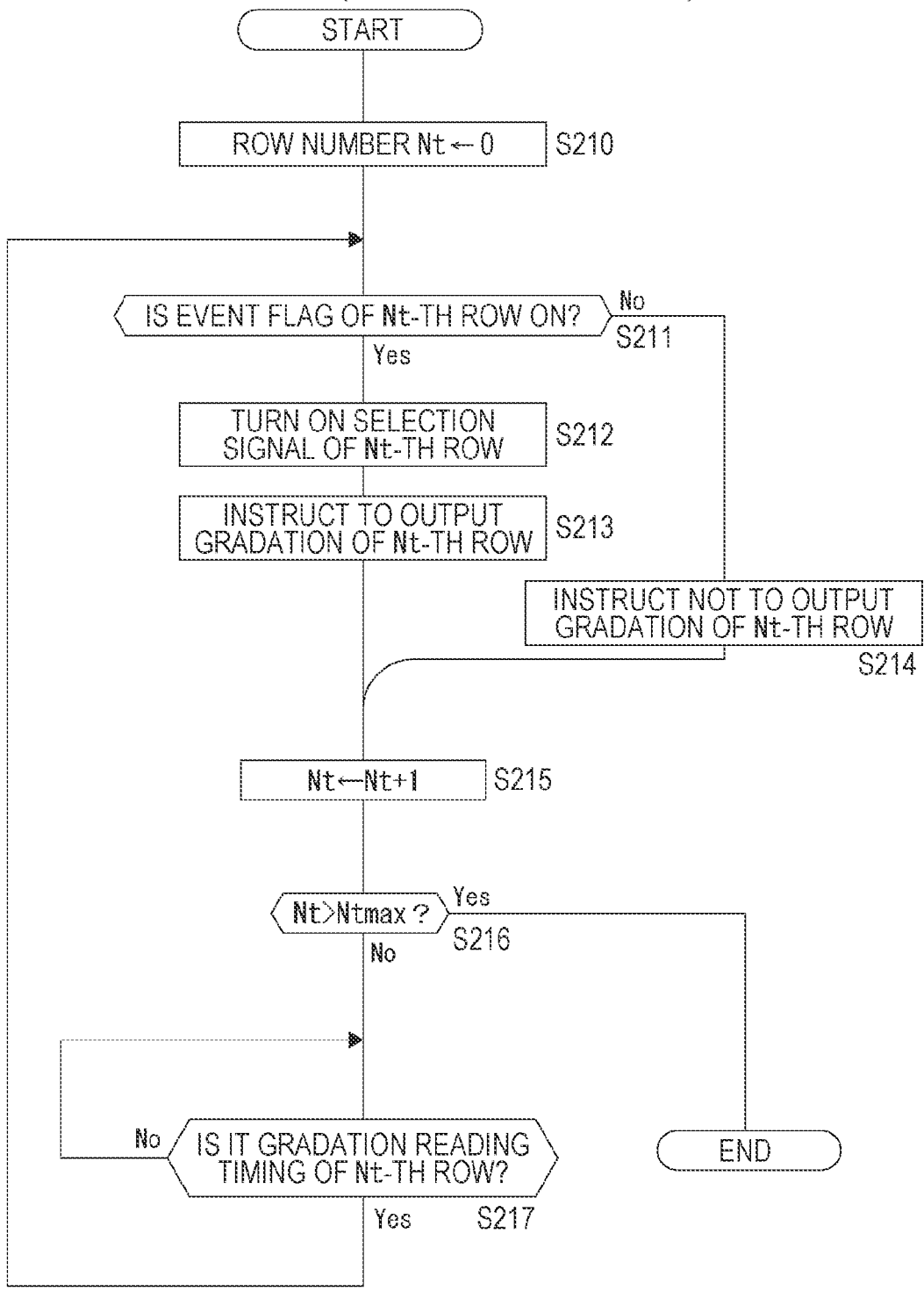
FIG. 17 is also a flowchart illustrating an example of a processing procedure of the row control circuit for realizing the reading method as the second embodiment.

FIGS. 15 to 17 are flowcharts illustrating an example of a processing procedure for realizing the reading method as the second embodiment described above.

FIG. 15 illustrates a processing procedure of the event processing/output circuit 4B. Note that the event processing/output circuit 4B repeatedly executes processing illustrated in FIG. 15 every time event signal reading is performed in units of rows.

In FIG. 15, in step S101, the event processing/output circuit 4B determines whether or not there is an event occurring pixel in a row. In the present example, presence or absence of occurrence of the event is determined on the basis of whether or not at least one of the first polarity event signal Vop or the second polarity event signal Vom is obtained by a value indicating the occurrence of the event.

If there is an event occurring pixel in the row, the event processing/output circuit 4B proceeds to step S102, outputs a determination signal indicating presence of an event to the row control circuit 3B as an event presence/absence determination signal in units of rows, and terminates a series of processing illustrated in FIG. 15.

On the other hand, if there is no event occurring pixel in the row, the event processing/output circuit 4B proceeds to step S103, outputs a determination signal indicating absence of an event to the row control circuit 3B as the event presence/absence determination signal in units of rows, and terminates the series of processing illustrated in FIG. 15.

FIGS. 16 and 17 are flowcharts illustrating a processing procedure of the row control circuit 3B. FIG. 16 illustrates processing on an event reading side, and FIG. 17 illustrates processing on a gradation reading side.

In FIG. 16, the row control circuit 3B resets a row number Ni to 0 in step S201. The row number Ni is number information for identifying a row to be processed for the event signal.

In step S202 subsequent to step S201, the row control circuit 3B starts row sequential selection on the event reading side. That is, processing of sequentially performing in rows row selection for event signal reading by the event selection signal SLC-I is started.

In step S203 subsequent to step S202, the row control circuit 3B determines whether or not a determination signal of an Ni-th row is a determination signal indicating presence of an event. That is, with respect to the event presence/absence determination signal sequentially obtained in rows from the event processing/output circuit 4B with the row sequential selection for event reading started in step S202, it is determined whether or not the determination signal of the Ni-th row is the determination signal indicating the presence of the event.

If the determination signal of the Ni-th row is the determination signal indicating the presence of the event, the row control circuit 3B proceeds to step S204, turns on an event flag of the Ni-th row, and proceeds to step S206.

On the other hand, if the determination signal of the Ni-th row is not the determination signal indicating the presence of the event, the row control circuit 3B proceeds to step S205, turns off the event flag of the Ni-th row, and proceeds to step S206.

In step S206, the row control circuit 3B turns on a reset signal of the Ni-th row. That is, the reference level reset signal RST-I described above is turned on to reset the reference level Lref.

In step S207 following step S206, the row control circuit 3B determines whether or not the row number Ni is equal to or larger than a maximum value Nimax. The maximum value Nimax is a maximum value of the row number Ni, and is set to the same value as the row number Ni of the last row in the pixel array unit 2.

If the row number Ni is not equal to or larger than the maximum value Nimax, the row control circuit 3B proceeds to step S208, increments the row number Ni by 1, and returns to step S203. Therefore, for each pixel row, setting of the event flag based on the event presence/absence determination signal (S204 or S205) and resetting of the reference level Lref (S206) are performed.

In step S207, if the row number Ni is equal to or larger than the maximum value Nimax, the row control circuit 3B ends a series of processing illustrated in FIG. 16.

The processing on the gradation reading side in FIG. 17 will be described.

In FIG. 17, the row control circuit 3B resets a row number Nt to 0 in step S210. The row number Nt is number information for identifying a row to be processed for the gradation signal.

In step S211 following step S210, the row control circuit 3B determines whether or not an event flag of an Nt-th row is on. If the event flag of the Nt-th row is on, the row control circuit 3B proceeds to step S212, turns on a selection signal (gradation selection signal SLC-T) of the Nt-th row, instructs the gradation output circuit 5B to output gradation of the Nt-th row in step S213, and proceeds to step S215.

Here, the instruction to output the gradation is performed, for example, by turning on an enable signal to the gradation output circuit 5B. In response to the instruction to output the gradation, the gradation output circuit 5B executes processing related to gradation signal output for the row in which gradation reading has been performed by the processing of step S212.

On the other hand, in a case where it is determined in step S211 that the event flag of the Nt-th row is not on, the row control circuit 3B proceeds to step S214, instructs the gradation output circuit 5B not to output the gradation of the Nt-th row, and proceeds to step S215.

Here, the instruction so as not to output the gradation is performed, for example, by turning off the enable signal to the gradation output circuit 5B. In response to the instruction so as not to output the gradation, the gradation output circuit 5B does not execute the processing related to the gradation signal output.

The row control circuit 3B increments the row number Nt by 1 in step S215, and determines whether or not the row number is larger than a maximum value Ntmax in subsequent step S216. The maximum value Ntmax is a maximum value of the row number Nt, and is set to the same value as the row number Nt of the last row in the pixel array unit 2.

If the row number Nt is not larger than the maximum value Ntmax, the row control circuit 3B proceeds to step S217, waits until gradation reading timing of the Nt-th row comes, and returns to step S211 if the gradation reading timing of the Nt-th row comes.

Therefore, for each pixel row, execution/non-execution of the reading of the gradation signal and execution/non-execution of the processing related to the gradation output in the gradation output circuit 5B are controlled according to the value of the event flag.

Note that FIG. 14 illustrates an example in which the electronic shutter operation is not performed for the row in which the occurrence of the event is not recognized and the gradation signal is not read.

Figure 18:
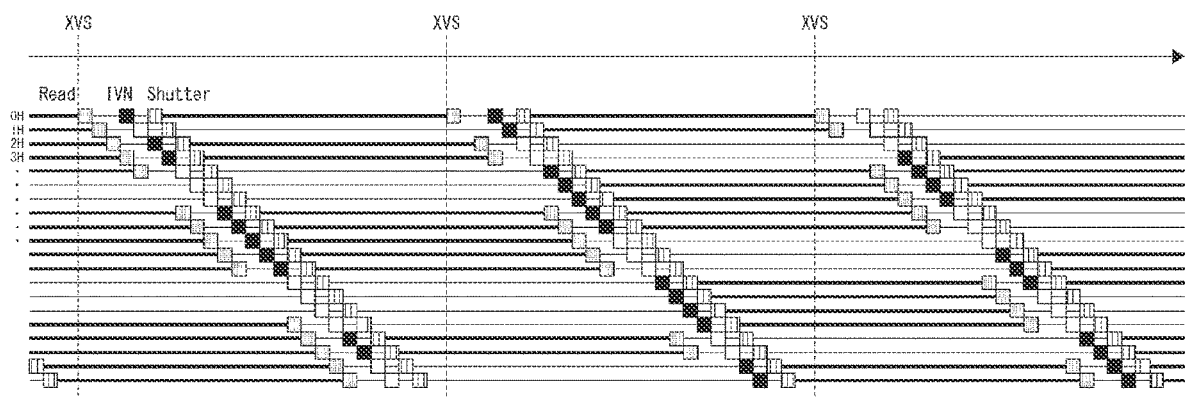
FIG. 18 is a timing chart for an example in which electronic shutter operation is performed for all rows in the second embodiment.

However, as illustrated in a timing chart of FIG. 18, electronic shutter operation (charge reset of the photodiode PD and the floating diffusion FD) can be performed for all rows regardless of whether or not the gradation signal is read.

In this case, the row control circuit 3B turns on and then turns off the gradation transfer drive signal TG-T and the charge reset signal RST-T even for a row determined to have no event by an event presence/absence determination signal, thereby executing the electronic shutter operation.

By performing the electronic shutter operation for all the rows regardless of whether or not the gradation signal is read as described above, it is possible to periodically reset a charge of the photodiode PD in a frame period.

Therefore, it is possible to prevent the charge of the photodiode PD from not being reset, which adversely affects generation of a gradation signal and an event signal in another pixel.

Furthermore, in FIG. 14, the example has been described in which the event signal is generated and read before the electronic shutter operation is started. In the second embodiment as well, the event signal can be generated and read during the execution period of charge accumulation, as illustrated in FIG. 9.

Figure 19:
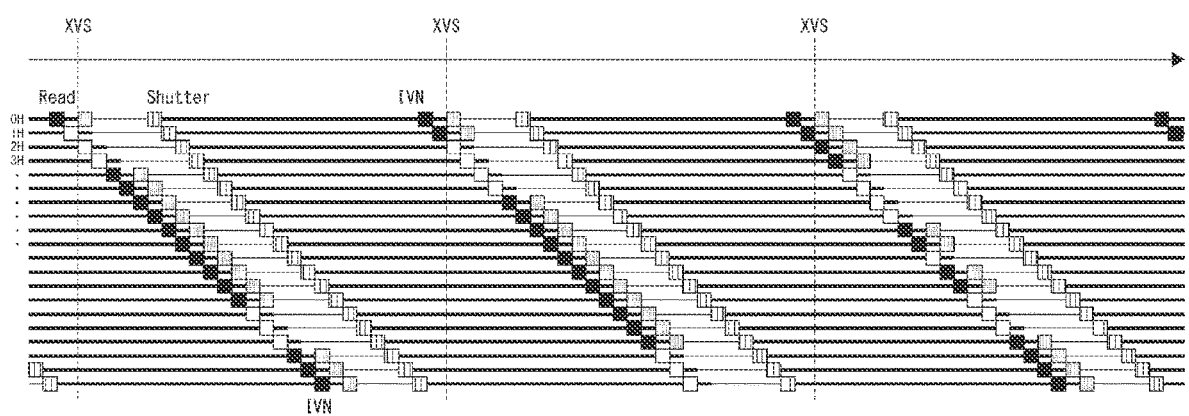
FIG. 19 is a timing chart for an example in which generation and reading of the event signal are performed during an execution period of charge accumulation related to generation of the gradation signal in the second embodiment.

FIG. 19 illustrates a timing chart in that case.

Here, in a case of using the pixel array unit 2A in the second embodiment, a determination of presence or absence of occurrence of an event (determination as to whether or not to read a gradation signal) is performed in units of pixel units 20A. That is, since the pixel unit 20A includes two rows in the present example, the determination is made in units of two rows. Specifically, if there is a pixel 21-I in which an event has occurred on the basis of an event signal read in units of rows, the event processing/output circuit 4B in this case outputs an event presence/absence determination signal indicating presence of the event to the row control circuit 3B for a pixel row including the pixel 21-I and a subsequent pixel row.

Here, charge accumulation time related to generation of the gradation signal can be changed according to polarity of an event signal.

Figure 20:
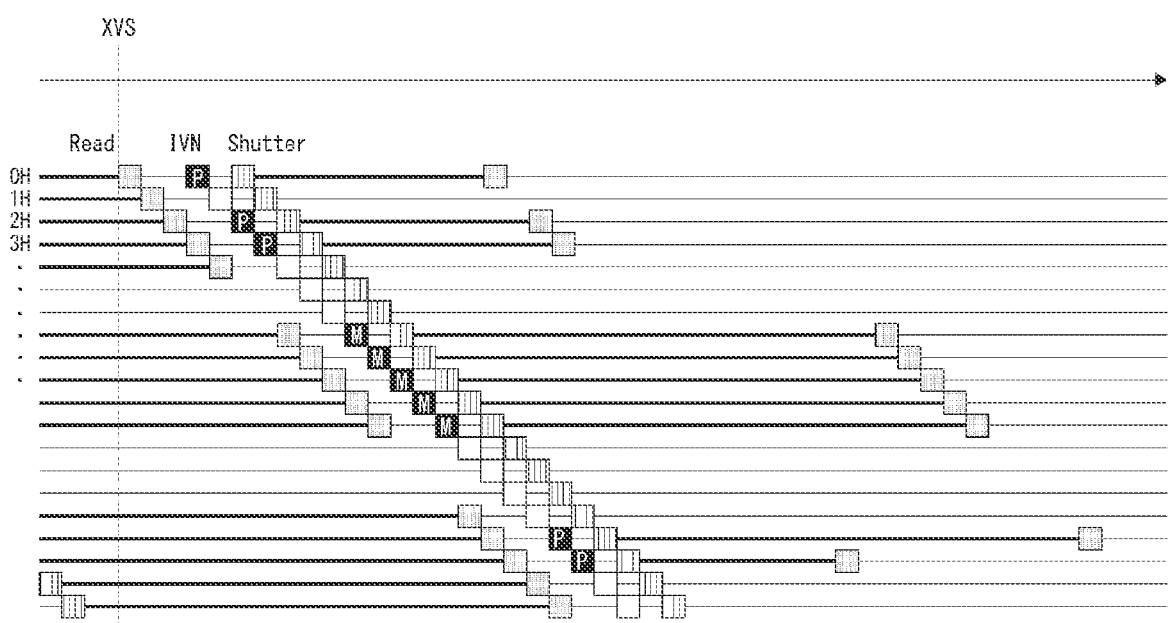
FIG. 20 is a timing chart for an example in which charge accumulation time is changed according to polarity of the event signal.

FIG. 20 illustrates a timing chart in a case where the charge accumulation time is changed according to the polarity of the event signal as described above.

Note that, in FIG. 20 and FIG. 21 described next, regarding a square mark ("IVN") representing generation and reading timings of the event signal, "P" is written for a row in which a first polarity event has been detected, and "M" is written for a row in which a second polarity event has been detected.

As illustrated, the charge accumulation time is shortened for the row in which the first polarity event has been detected, and the charge accumulation time is lengthened for the row in which the second polarity event has been detected.

Since the first polarity event is the event on the side in which the light reception amount increases, it is sufficient if the charge accumulation time of the gradation signal is short. Conversely, since the second polarity event is the event on the side in which the light reception amount decreases, it is desirable to increase the charge accumulation time of the gradation signal.

By changing the charge accumulation time according to the polarity of the event signal as described above, it is possible to adjust the charge accumulation time to an appropriate charge accumulation time according to the polarity of the event.

Here, in the same row, there is also a case where the pixel 21 in which the first polarity event has been detected and the pixel 21 in which the second polarity event has been detected are mixed. In that case, it is conceivable to treat that an event having a larger number of detected pixels among the first polarity event and the second polarity event has occurred in the target row.

Note that FIG. 20 illustrates an example in which the event signal is generated and read before the start of the electronic shutter operation in a case where the charge accumulation time is changed according to the polarity of the event. However, as illustrated in FIG. 21, even in a case where charge accumulation time is changed according to polarity of an event, an event signal can be generated and read during an execution period of charge accumulation.

In this case, the generation and reading timings of the event signal are set in accordance with the shorter one of the charge accumulation time corresponding to the first polarity event and the charge accumulation time corresponding to the second polarity event. Specifically, generation start timing of the event signal of each row in this case is set before the charge accumulation time corresponding to the first polarity event elapses from charge accumulation start timing in the row.

Therefore, for both a row in which the first polarity event has occurred and a row in which the second polarity event has occurred, the reading of the event signal can be completed before the timing of reading the gradation signal. That is, it is possible to determine whether or not the gradation signal is read on the basis of the event signal before the timing of reading the gradation signal arrives.

Note that the method of changing the charge accumulation time according to the polarity of the event can also be applied to a case where all-row reading of the gradation signal is performed as in the first embodiment.

In the above description, an example has been described in which the frame period is set to a constant period by allocating processing time for one row even to the row from which the gradation signal is not read.

Figure 22:
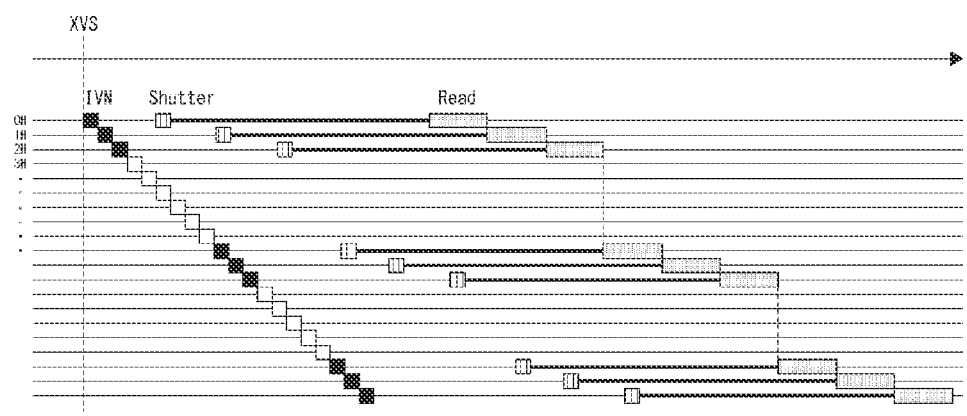
FIG. 22 is a timing chart for an example in which row selection for gradation signal reading is skipped.
Figure 23:
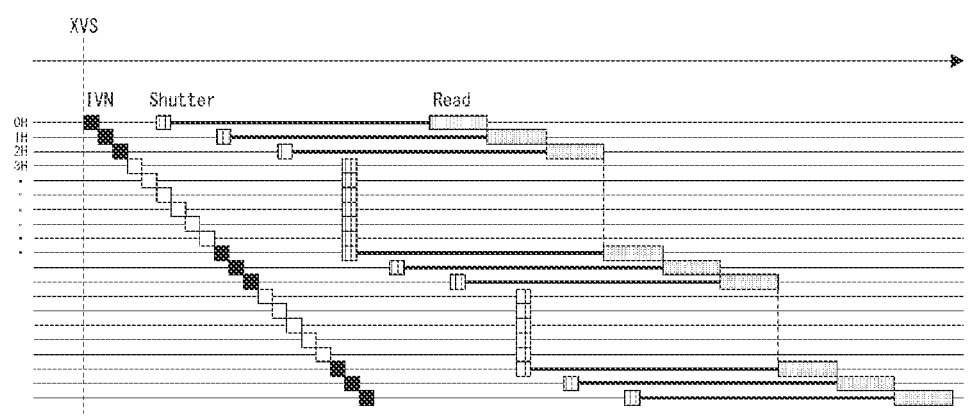
FIG. 23 is a timing chart for another example in which row selection for gradation signal reading is skipped.

However, as illustrated in the timing charts of FIGS. 22 and 23, for a row determined not to read the gradation signal, row selection for reading the gradation signal is skipped, and a frame period can be made variable according to the number of rows from which the gradation signal is read.

FIG. 22 illustrates an example in which electronic shutter operation is also skipped for the row determined not to read the gradation signal, and FIG. 23 illustrates an example in which the electronic shutter operation is also performed for the row determined not to read the gradation signal. In the example of FIG. 23, in a case where the rows in which it is determined that the gradation signals are not to be read are continuous, the electronic shutter operation for those rows is simultaneously performed.

In the row sequential selection, by skipping the row selection, an interval between selection timing of a row immediately before the skip and selection timing of a row immediately after the skip can be shortened to an interval of one row.

Therefore, time length until the gradation signals of the necessary rows are completely read can be shortened.

3. Third Embodiment

In a third embodiment, only a column in which an event has occurred outputs a gradation signal.

Figure 24:
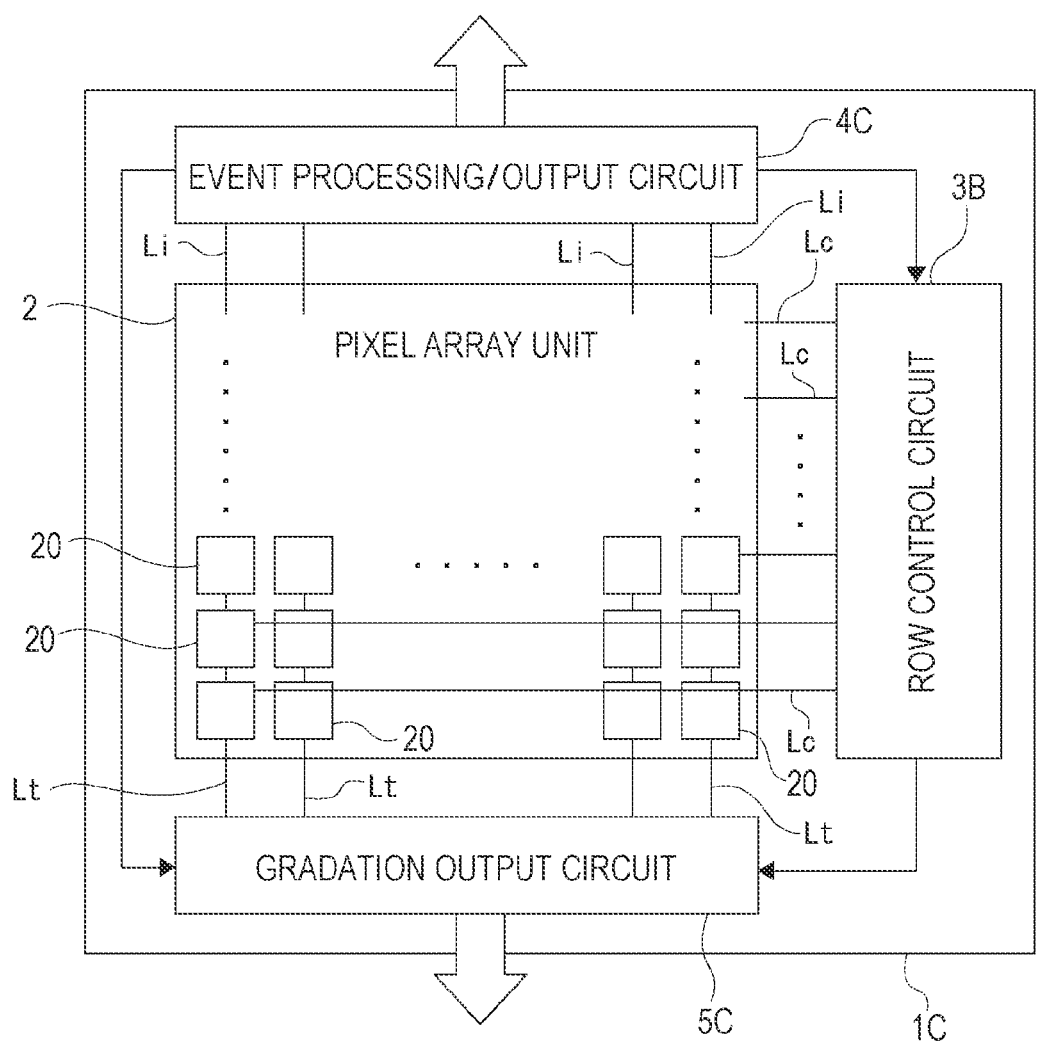
FIG. 24 is a block diagram illustrating an internal configuration example of a sensor device as a third embodiment.

FIG. 24 is a block diagram illustrating an internal configuration example of a sensor device 1C as the third embodiment.

A difference from the sensor device 1B as the second embodiment illustrated in FIG. 13 is that an event processing/output circuit 4C and a gradation output circuit 5C are provided instead of the event processing/output circuit 4B and the gradation output circuit 5B, respectively.

In addition to the function of the event processing/output circuit 4B, the event processing/output circuit 4C has a function of outputting, for every row, determination result information regarding presence or absence of occurrence of an event for every pixel 21 in the row (that is, for every column position), to the gradation output circuit 5C.

In addition to the function of the gradation output circuit 5B, the gradation output circuit 5C has a function of selectively outputting, for every row, a gradation signal of the pixel 21 for which it is determined that an event has occurred on the basis of the determination result information from the event processing/output circuit 4C.

Figure 25:
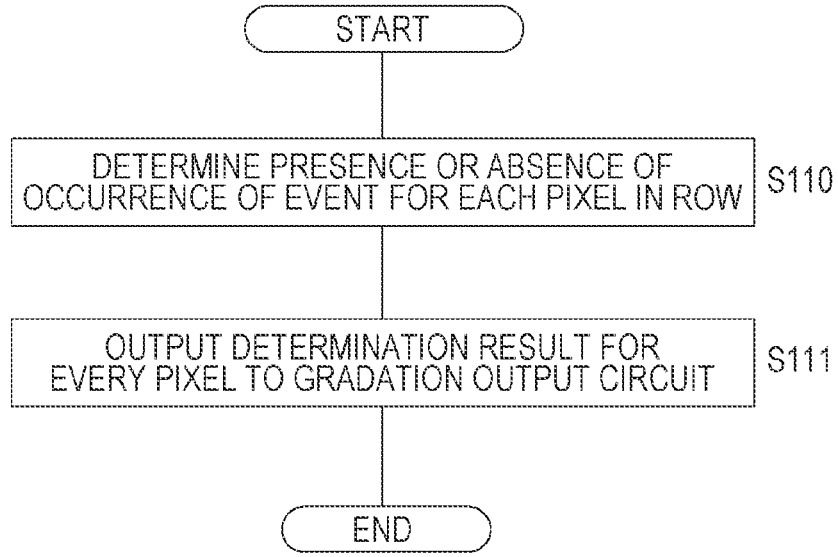
FIG. 25 is a flowchart illustrating an example of a processing procedure of an event processing/output circuit for realizing a reading method as the third embodiment.
Figure 26:
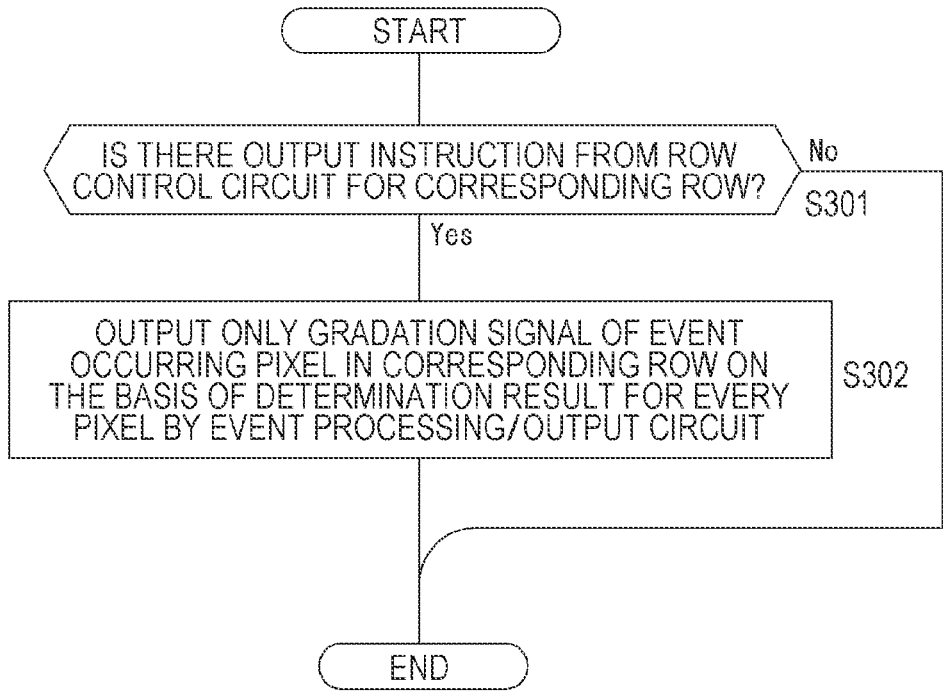
FIG. 26 is a flowchart illustrating an example of a processing procedure of a gradation output circuit for realizing the reading method as the third embodiment.

FIGS. 25 and 26 are flowcharts illustrating an example of a processing procedure for realizing a reading method as the third embodiment. FIG. 25 illustrates a processing procedure of the event processing/output circuit 4C, and FIG. 26 illustrates a processing procedure of the gradation output circuit 5C.

Processing of FIG. 25 is repeatedly executed by the event processing/output circuit 4C at every reading timing of the event signal in units of rows, and processing of FIG. 26 is repeatedly executed by the gradation output circuit 5C at every reading timing of the gradation signal in units of rows.

Note that the event processing/output circuit 4C performs the processing of outputting the event presence/absence determination signal to the row control circuit 3B illustrated in FIG. 15 separately from the processing illustrated in FIG. 25.

In FIG. 25, the event processing/output circuit 4C determines presence or absence of occurrence of an event for each pixel 21 in the row in step S110, outputs a determination result for every pixel 21 to the gradation output circuit 5C in subsequent step S111, and terminates a series of processing in FIG. 25.

In FIG. 26, in step S301, the gradation output circuit 5C determines whether or not there is an output instruction from the row control circuit 3B for the row. Note that the row means a row that has newly reached a timing of reading the gradation signal. In step S301, the gradation output circuit 5C determines whether or not there is an output instruction for the row as the output instruction performed by the row control circuit 3B in step S213 of FIG. 17.

If there is no output instruction from the row control circuit 3B, the gradation output circuit 5C ends a series of processing illustrated in FIG. 26. That is, in this case, the processing related to the output of the gradation signal is not performed for the row.

On the other hand, in a case where there is an output instruction from the row control circuit 3B, the gradation output circuit 5C proceeds to step S302, performs processing of outputting only a gradation signal of an event occurring pixel in the row on the basis of the determination result for every pixel 21 by the event processing/output circuit 4C, and ends the series of processing illustrated in FIG. 26. That is, the processing of outputting only the gradation signal of the event occurring pixel among the gradation signals read for the row is performed.

By selectively outputting the gradation signal of the pixel 21 in which it is determined that the event has occurred among the gradation signals read in units of rows as described above, it is not necessary to perform circuit operation for outputting the gradation signal at the column position where the occurrence of the event is not recognized.

Therefore, power consumption at an output stage of the gradation signal can be reduced, and power saving of the sensor device 1C can be achieved.

4. Fourth Embodiment

In a fourth embodiment, each pixel unit outputs an event signal to a row control unit as a signal indicating presence or absence of a request to read a gradation signal.

Figure 27:
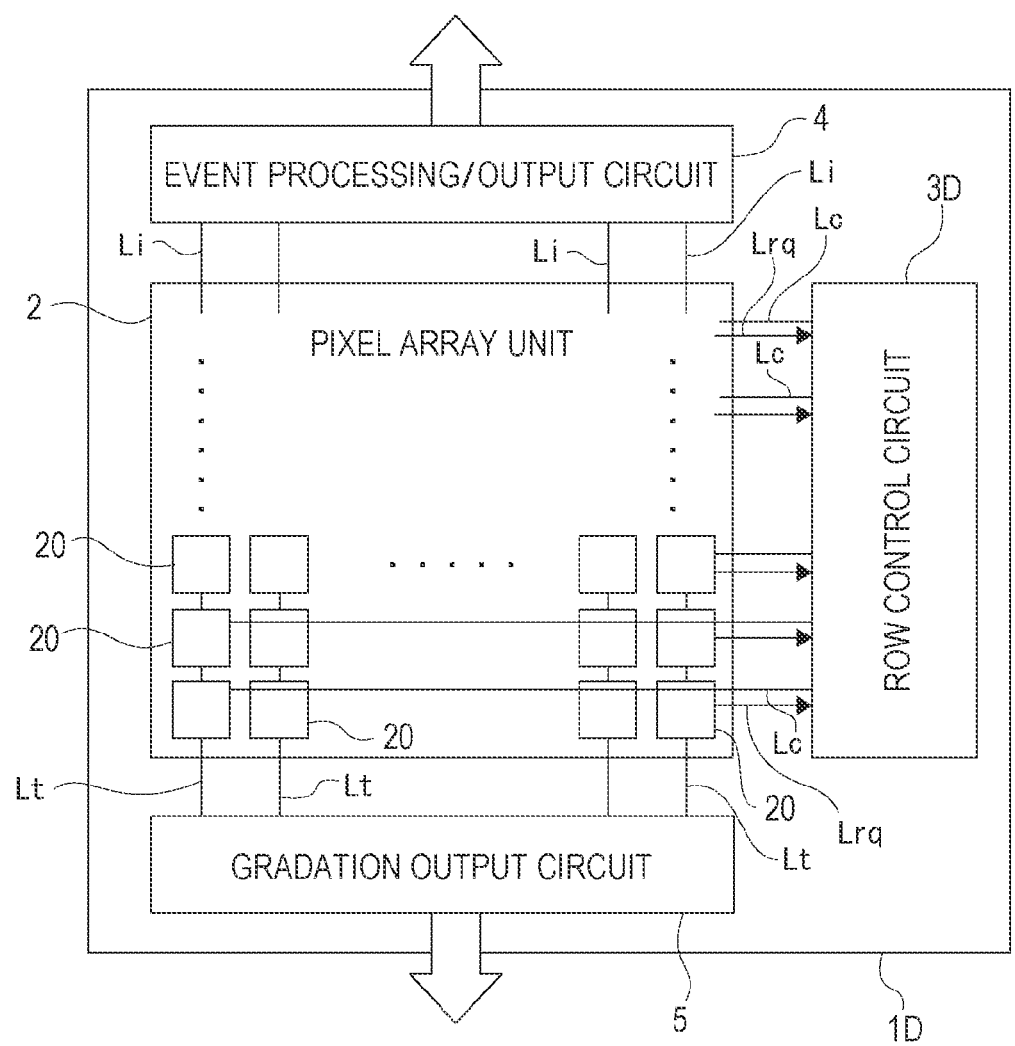
FIG. 27 is a block diagram illustrating an internal configuration example of a sensor device as a fourth embodiment.

FIG. 27 is a block diagram illustrating an internal configuration example of a sensor device 1D as the fourth embodiment.

A difference from the sensor device 1 as the first embodiment is that a row control circuit 3D is provided instead of the row control circuit 3, and a request signal line Lrq wired in a row direction is provided for every row in the pixel array unit 2.

Figure 28:
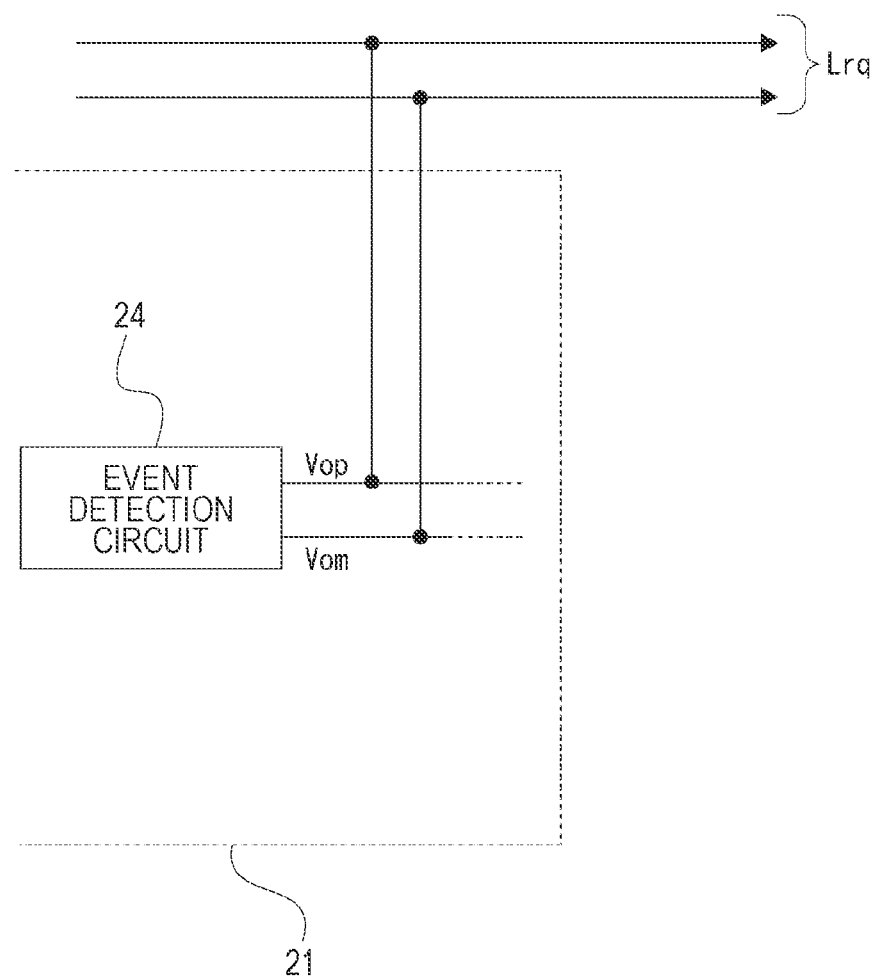
FIG. 28 is an explanatory diagram of a request signal line in the fourth embodiment.

As illustrated in FIG. 28, the number of request signal lines Lrq wired for every row is two, one wiring line is connected to an output line of the first polarity event signal Vop of the event detection circuit 24, and another wiring line is connected to an output line of the second polarity event signal Vom of the event detection circuit 24 in each pixel 21.

Therefore, in a case where occurrence of any of the first polarity event and the second polarity event has been detected in a certain pixel 21, the row control circuit 3D is notified of the occurrence of the event through the request signal line Lrq of the row in which the pixel 21 is arranged.

In FIG. 27, the row control circuit 3D determines a row from which a gradation signal is to be read on the basis of an event signal (first polarity event signal Vop, second polarity event signal Vom) input through the request signal line Lrq. Then, for the row determined to be read, row selection for reading the gradation signal is sequentially performed in rows.

Figure 29:
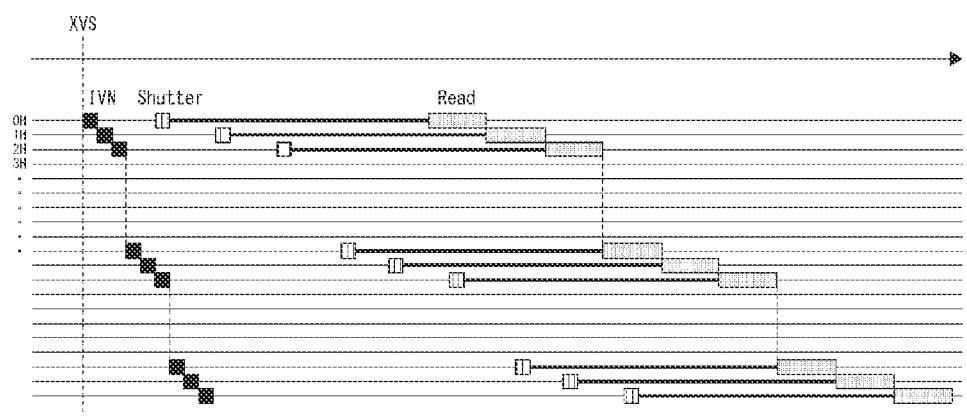
FIG. 29 is a timing chart for explaining a reading method as the fourth embodiment.

FIG. 29 is a timing chart for explaining a reading method as the fourth embodiment.

First, the row control circuit 3D performs processing for reading an event signal to the event processing/output circuit 4. Specifically, reading of the event signal in this case is sequentially performed in rows, and for a row in which it is determined that no event has occurred on the basis of the event signal input through the request signal line Lrq, row selection for reading the event signal is skipped.

Furthermore, the row control circuit 3D sequentially performs reading of the gradation signal in rows, and skips row selection for reading the gradation signal for the row in which it is determined that no event has occurred on the basis of the event signal input through the request signal line Lrq.

Note that, in an example of FIG. 29, electronic shutter operation is also skipped for the row in which it is determined that no event has occurred. However, similarly to the case of FIG. 23, the electronic shutter operation can also be performed for the row in which it is determined that no event has occurred (that is, the row determined not to read the gradation signal).

Figure 30:
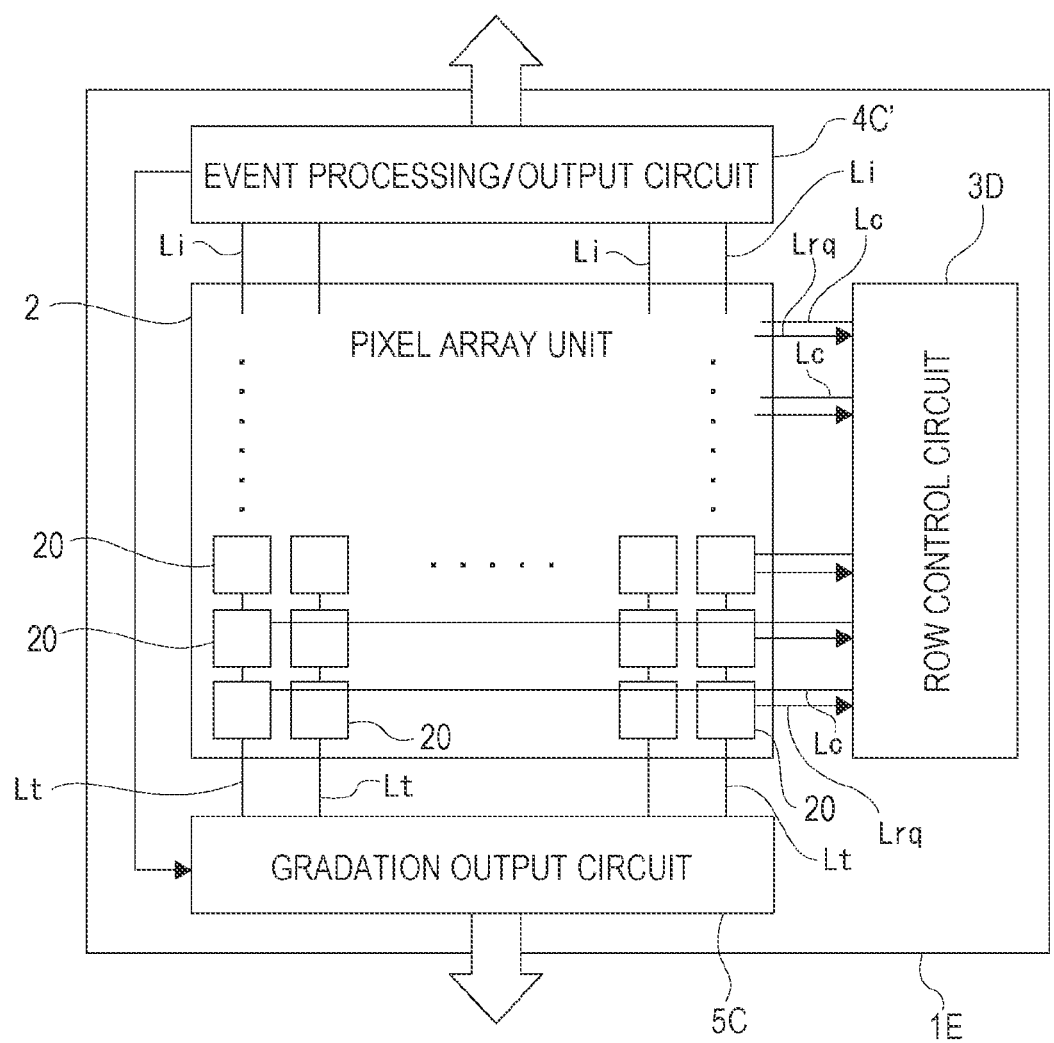
FIG. 30 is a block diagram illustrating an internal configuration example of a sensor device as a modification of the fourth embodiment.

FIG. 30 is a block diagram illustrating an internal configuration example of a sensor device 1E as a modification of the fourth embodiment.

A difference from the sensor device 1D illustrated in FIG. 27 is that an event processing/output circuit 4C' and a gradation output circuit 5C are provided instead of the event processing/output circuit 4 and the gradation output circuit 5, respectively.

The event processing/output circuit 4C' is different from the event processing/output circuit 4C (see FIG. 24) in that the above-described function of outputting the event presence/absence determination signal is omitted.

The gradation output circuit 5C selectively outputs a gradation signal of the pixel 21 in which it is determined that an event has occurred for the gradation signal read in units of rows, on the basis of determination result information of presence or absence of an event for every pixel 21 output in units of rows by the event processing/output circuit 4C'.

Therefore, similarly to the case of the third embodiment, it is not necessary to perform circuit operation for outputting a gradation signal at a column position where occurrence of an event is not recognized, and power consumption at an output stage of the gradation signal can be reduced.

5. Fifth Embodiment

In a fifth embodiment, it is determined whether or not gradation reading can be performed on the basis of the number of occurrences of an event.

Note that, in the fifth embodiment, since a configuration of a sensor device is similar to that of the sensor device 1B in the second embodiment, redundant description is avoided.

In the fifth embodiment, the event processing/output circuit 4B counts the number of occurrences of an event on the basis of an event signal for a unit pixel region Rp1 including the pixel unit 20 in a predetermined row, and determines whether or not a gradation signal can be read for the unit pixel region Rp1 on the basis of the counted number of occurrences of the event.

Here, the unit pixel region Rp1 means, for example, a region including the pixel units 20 (20A) of n (n≥1) rows. Note that, in a case where one pixel unit extends over two rows as in the pixel unit 20A, the unit pixel region Rp1 is a region including 2n rows of pixel rows.

If the number of occurrences of the event (the number of pixels in which the event has occurred) counted for the unit pixel region Rp1 is equal to or larger than a predetermined threshold (hereinafter referred to as a "threshold m"), the event processing/output circuit 4B obtains a determination result that the gradation signal is read for the unit pixel region Rp1.

The row control circuit 3B in this case reads the gradation signal only for the unit pixel region Rp1 for which it is determined to read the gradation signal on the basis of the determination result of whether or not to read for every unit pixel region Rp1 by the event processing/output circuit 4B.

Figure 31:
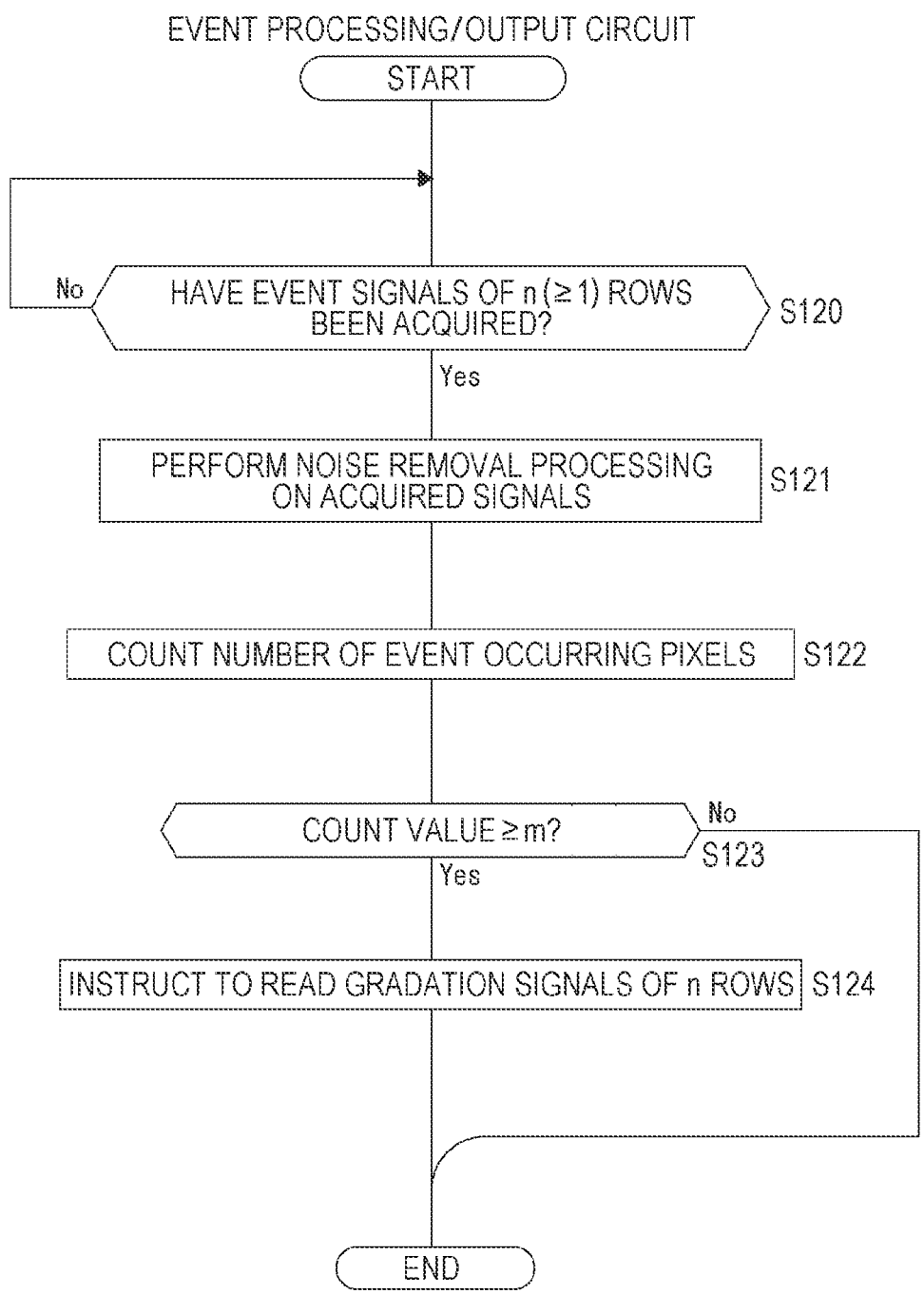
FIG. 31 is a flowchart illustrating an example of a processing procedure to be executed by the event processing/output circuit to realize a reading method as a fifth embodiment.

FIG. 31 is a flowchart illustrating an example of a processing procedure to be executed by the event processing/output circuit 4B in order to realize a reading method as the fifth embodiment.

Note that the event processing/output circuit 4B repeatedly executes processing illustrated in FIG. 31 at a predetermined cycle.

In FIG. 31, in step S120, the event processing/output circuit 4B waits until event signals of n rows are acquired. That is, for the event signals sequentially read in rows under the control of the row control circuit 3B, waiting is performed until the event signals of n rows are acquired.

In a case where the event signals of n rows are acquired, the event processing/output circuit 4B proceeds to step S121 and performs noise removal processing on the acquired signals. The noise removal processing is processing of removing an event estimated to have been erroneously detected due to noise.

Normally, since an event occurs in a pixel region that is aggregated to some extent, it is possible to estimate that an event occurring pixel in which no other event occurring pixel exists in the vicinity is a pixel in which occurrence of an event has been erroneously detected due to noise. In the noise removal processing, a pixel in which the occurrence of the event is estimated to have been erroneously detected due to the noise is specified in this way, and the pixel is excluded from the event occurring pixels.

In response to performing the noise removal processing in step S121, the event processing/output circuit 4B counts the number of event occurring pixels in step S122, and determines whether or not a count value (that is, the number of event occurring pixels) is equal to or larger than the threshold m in subsequent step S123.

If the count value is equal to or larger than the threshold m, the event processing/output circuit 4B proceeds to step S124 to instruct the row control circuit 3B to read gradation signals of n rows, and terminates a series of processing illustrated in FIG. 31.

On the other hand, if the count value is not equal to or larger than the threshold m, the event processing/output circuit 4B ends the series of processing illustrated in FIG. 31. That is, in this case, the instruction to read the gradation signal is not issued to the row control circuit 3B, and the gradation signal is not read for the unit pixel region Rp1.

Note that, in the processing shown in FIG. 31, it is not essential to perform the noise removal processing of step S121.

6. Sixth Embodiment

In a sixth embodiment, it is determined whether or not to read a gradation signal on the basis of whether or not an object has been recognized by object recognition processing based on an event signal.

Note that, also in the sixth embodiment, a configuration of a sensor device is similar to that of the sensor device 1B in the second embodiment, and thus redundant description is avoided.

In the sixth embodiment, the event processing/output circuit 4B performs the object recognition processing based on the event signal for a unit pixel region Rp2 including the pixel units 20 in a predetermined plurality of rows, and determines whether or not the gradation signal can be read for the unit pixel region Rp2 on the basis of presence or absence of recognition of the object by the object recognition processing.

Specifically, in a case where the object has been recognized as a result of performing the object recognition processing based on the event signal for the unit pixel region Rp2, the event processing/output circuit 4B obtains a determination result that the gradation signal is read for the unit pixel region Rp2.

The row control circuit 3B in this case reads the gradation signal only for the unit pixel region Rp2 for which it is determined to read the gradation signal on the basis of the determination result of whether or not to read for the unit pixel region Rp2 by the event processing/output circuit 4B.

Figure 32:
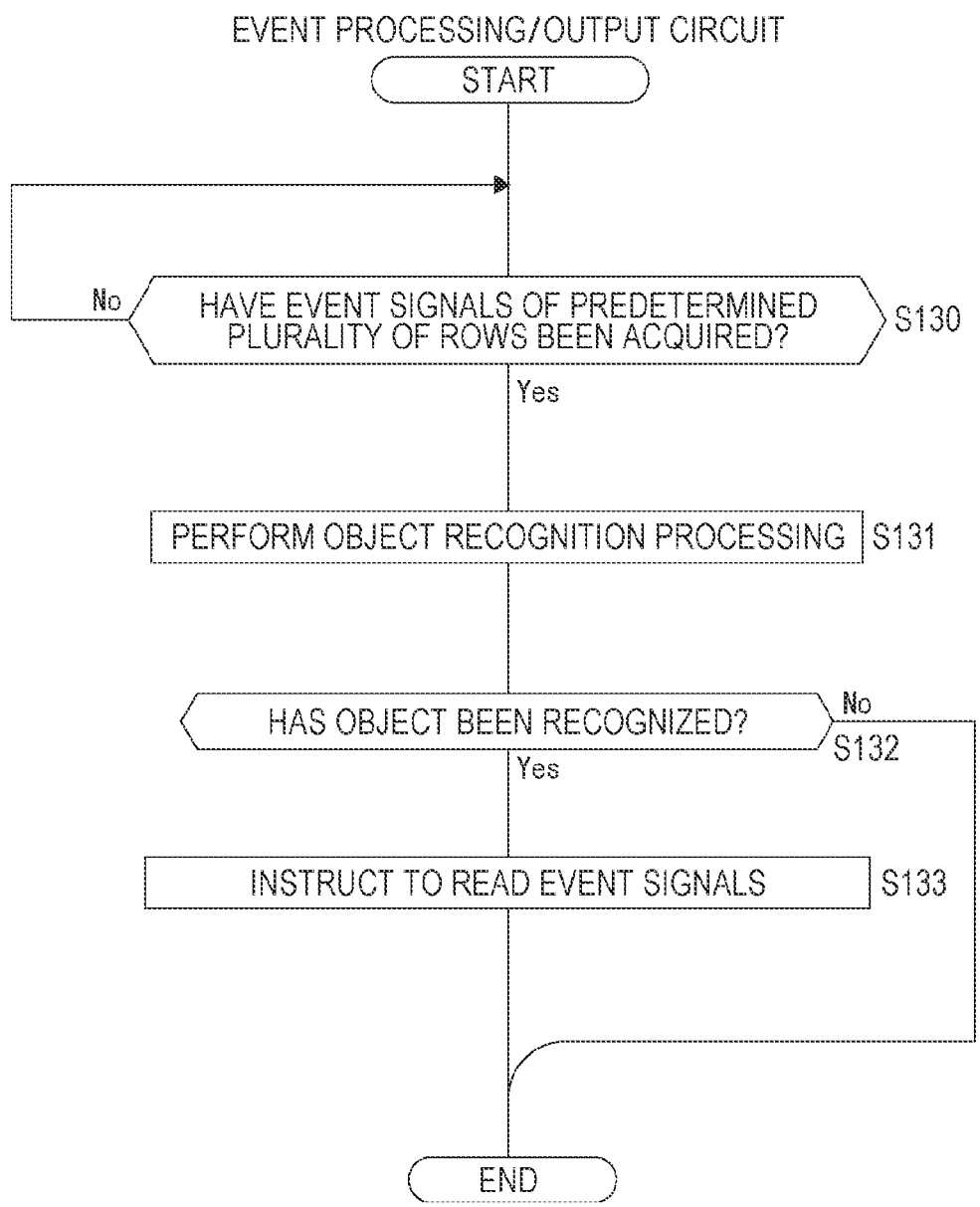
FIG. 32 is a flowchart illustrating an example of a processing procedure to be executed by the event processing/output circuit to realize a reading method as a sixth embodiment.

FIG. 32 is a flowchart illustrating an example of a processing procedure to be executed by the event processing/output circuit 4B in order to realize a reading method as the sixth embodiment.

The event processing/output circuit 4B repeatedly executes processing illustrated in FIG. 32 at a predetermined cycle.

In FIG. 32, in step S130, the event processing/output circuit 4B waits until event signals of a predetermined plurality of rows are acquired. That is, for the event signals sequentially read in rows by the control of the row control circuit 3B, waiting is performed until the event signals of the predetermined plurality of rows are acquired.

In a case where the event signals of the predetermined plurality of rows are acquired, the event processing/output circuit 4B proceeds to step S131 and performs the object recognition processing. Note that, as the object recognition processing, processing of recognizing a predetermined target object such as a person, an animal, and a vehicle, for example, is performed. Many methods are already known as a specific method of such object recognition processing. It is sufficient if a known method is applied, and the method is not limited to a specific method.

In step S132 subsequent to step S131, the event processing/output circuit 4B determines whether or not an object has been recognized.

In a case where it is determined that the object has been recognized, the event processing/output circuit 4B proceeds to step S133, instructs the row control circuit 3B to read the gradation signal, and terminates a series of processing illustrated in FIG. 32. That is, an instruction to read the gradation signal is issued for the unit pixel region Rp2 of the predetermined plurality of rows.

On the other hand, in a case where it is determined that the object has not been recognized, the event processing/output circuit 4B ends the series of processing illustrated in FIG. 32. That is, in this case, the instruction to read the gradation signal is not issued to the row control circuit 3B, and the gradation signal is not read for the unit pixel region Rp2.

Note that, in the processing of FIG. 32, after the event signals of the predetermined plurality of rows are acquired in step S130, the above-described noise removal processing may be performed on the acquired signals.

Therefore, in the object recognition processing executed in step S131, object recognition accuracy can be improved by noise removal effect.

7. Modifications

Note that the specific examples described so far are merely examples, and the present technology can adopt configurations as various modifications.

For example, the specific circuit configuration of each unit exemplified above is merely an example, and other configurations can be adopted.

Figure 33:
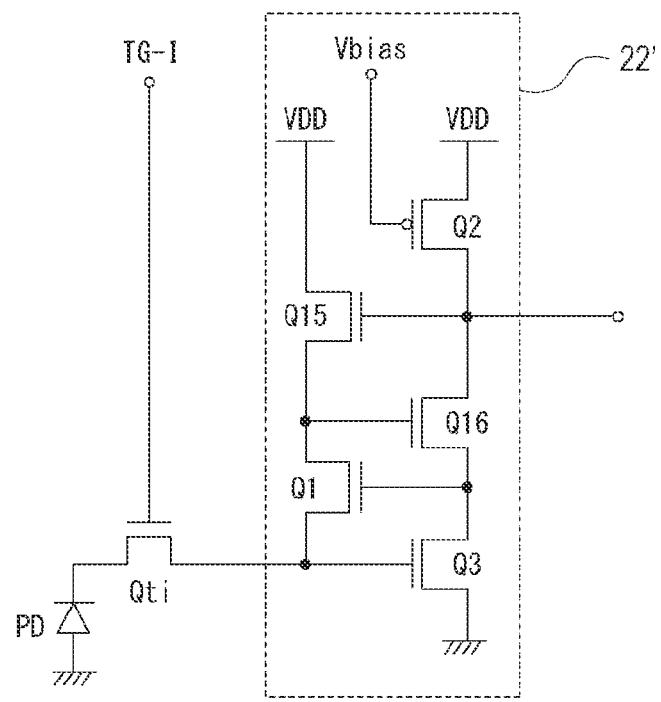
FIG. 33 is a circuit diagram showing a configuration as a modification of a logarithmic conversion unit.

For example, regarding the logarithmic conversion unit 22 illustrated in FIG. 3 and the like, a configuration in which transistors Q15 and Q16 are stacked on a set of the transistors Q1 and Q3 to form a double stack can be adopted as in a logarithmic conversion unit 22' illustrated in FIG. 33.

Figure 34:
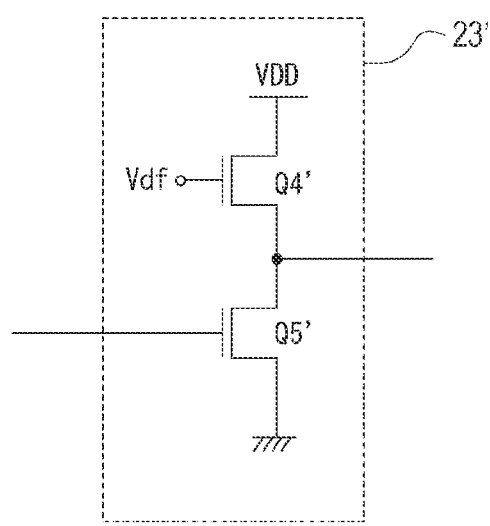
FIG. 34 is a circuit diagram showing a configuration as a modification of a buffer.

Furthermore, regarding the buffer 23, a configuration using N-type transistors Q4' and Q5' instead of the P-type transistors Q4 and Q5 can be adopted as in a buffer 23' illustrated in FIG. 34.

Figure 35:
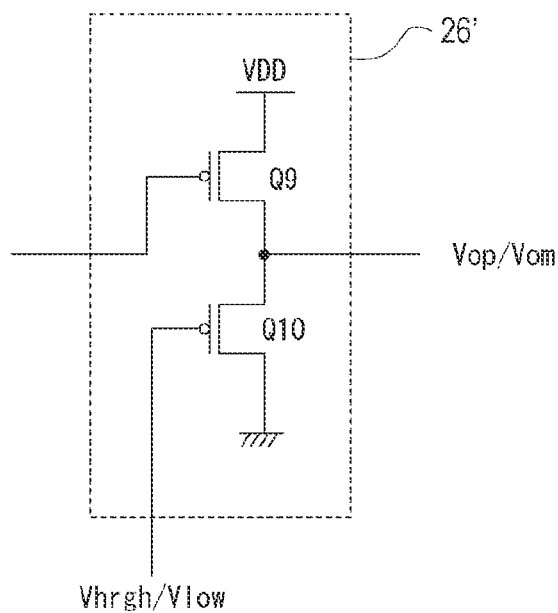
FIG. 35 is a circuit diagram showing a configuration as a modification of a quantizer.

Furthermore, regarding the quantizer 26 in the event detection circuit 24 (see FIG. 7), a configuration in which the first polarity event signal Vop and the second polarity event signal Vom can be time-divisionally output by a common comparator by providing only one comparator and switching and inputting the voltage Vhigh and the voltage Vlow to the comparator can be adopted as in a quantizer 26' illustrated in FIG. 35.

Figure 36:
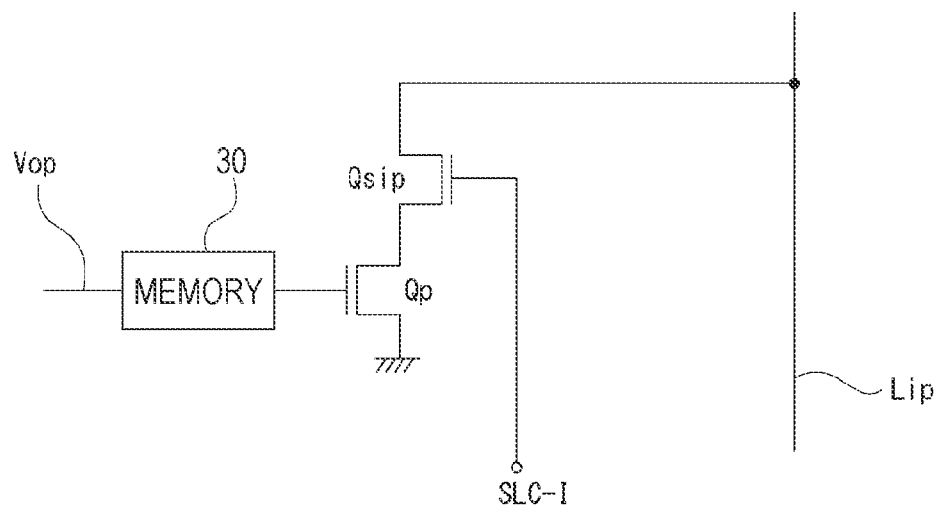
FIG. 36 is a circuit diagram showing a configuration as a modification of an output stage of an event signal in a pixel.

Furthermore, regarding a configuration of an output stage of an event signal in a pixel, a configuration in which a memory 30 that temporarily holds the event signal is provided can be adopted as illustrated in FIG. 36. Note that although FIG. 36 illustrates an example in which the memory 30 is provided for the first polarity event signal Vop, the similar memory 30 is provided for the second polarity event signal Vom.

Here, in the sensor device (1, 1B, 1C, 1D, 1E) of each embodiment described so far, a circuit portion including the photodiode PD, the gradation transfer transistor Qtt, the event transfer transistor Qti, the floating diffusion FD, the reset transistor Qr, the amplification transistor Qat, and the gradation selection transistor Qst and a circuit portion related to event detection including the event detection circuit 24 in the pixel array unit 2 can be configured as separate chips. Then, these chips can be stacked, for example, in a vertical direction (chip thickness direction). At this time, bonding between the chips can be performed by, for example, Cu-Cu connection (cupper-cupper connection), connection using a microbump, connection using a through-silicon via (TSV), and the like.

Figure 37:
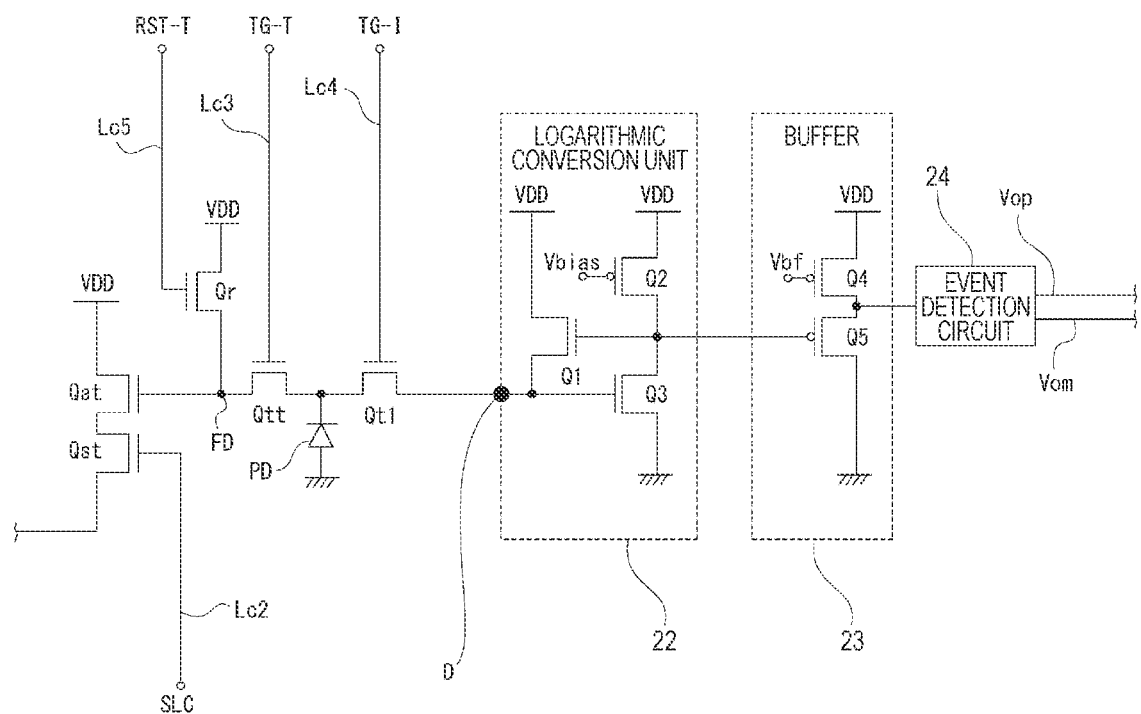
FIG. 37 is a circuit diagram illustrating a specific example of a connection point between chips.
Figure 38:
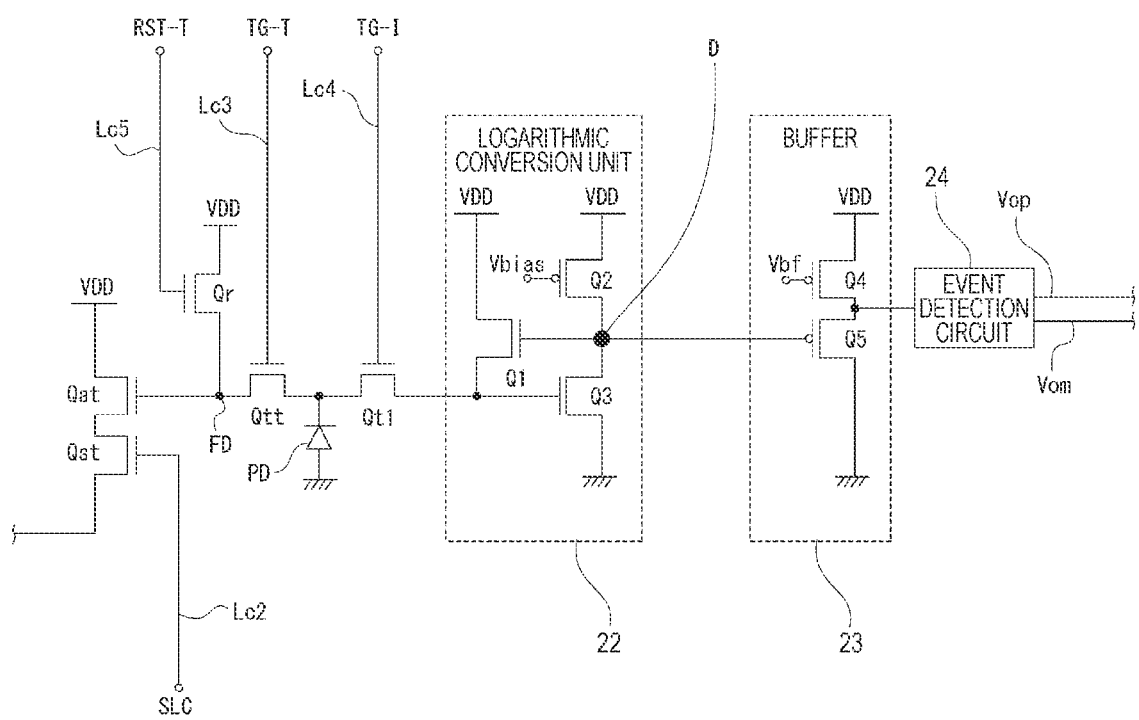
FIG. 38 is a circuit diagram illustrating another example of the connection point between the chips.
Figure 39:
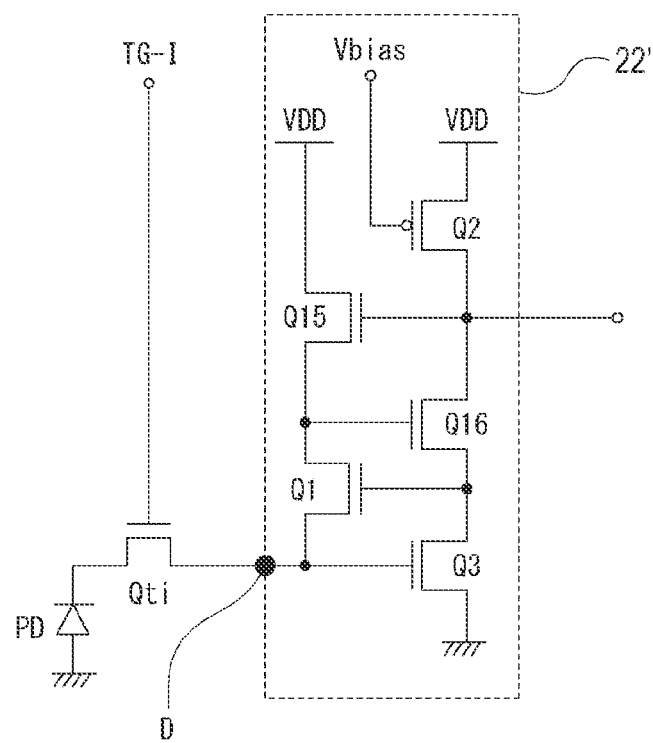
FIG. 39 is a circuit diagram illustrating another example of the connection point between the chips.

FIGS. 37 to 39 illustrate specific examples of a connection point D between the chips.

FIG. 37 illustrates an example in which a connection point between the event transfer transistor Qti and the logarithmic conversion unit 22 is set as the connection point D between the chips.

FIG. 38 illustrates an example in which a connection point between the transistor Q2 and the transistor Q3 in the logarithmic conversion unit 22 is set as the connection point D between the chips.

FIG. 39 illustrates an example in which a connection point between the event transfer transistor Qti and the logarithmic conversion unit 22' is set as the connection point D between the chips in a case where the logarithmic conversion unit 22' illustrated in FIG. 33 is used.

Figure 40:
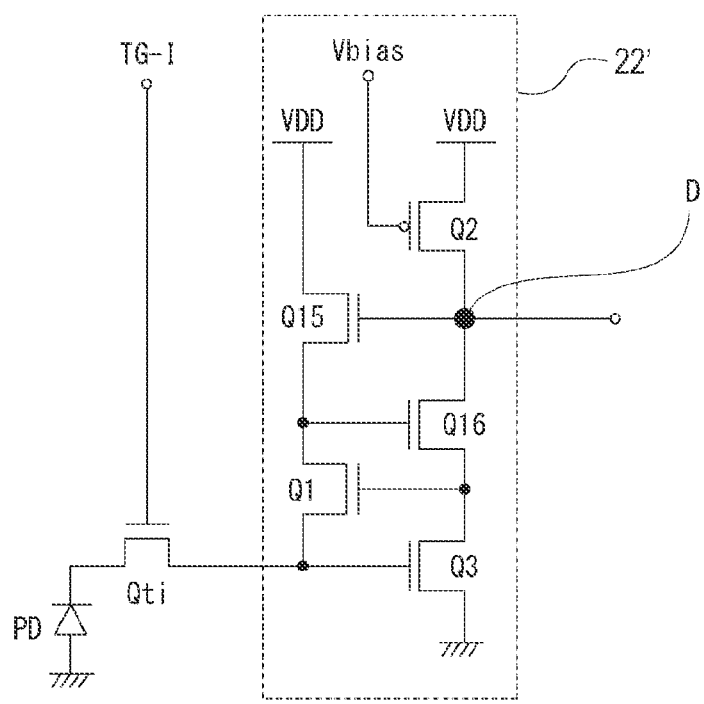
FIG. 40 is a circuit diagram illustrating still another example of the connection point between the chips.

FIG. 40 illustrates an example in which a connection point between the transistor Q2 and the transistor Q16 in the logarithmic conversion unit 22' is set as the connection point D between the chips in a case where the logarithmic conversion unit 22' is similarly used.

Here, in the above description, an example has been described in which the present technology is applied to a case where both the first polarity event and the second polarity event are detected as the event signals, but the present technology can also be suitably applied to a configuration in which only the first polarity event (or only the second polarity event) is detected.

8. Summary of Embodiments

As described above, a sensor device (1, 1B, 1C, 1D, 1E) as an embodiment includes: a pixel array unit (2 or 2A) in which a plurality of pixel units (20 or 20A) each having one or a plurality of pixels (21, or 21-T and 21-I) and capable of generating a gradation signal indicating intensity of a light reception amount and an event signal indicating a change in the light reception amount is two-dimensionally arranged; and a row control unit (row control circuit 3, 3B, 3C, 3D) that can sequentially execute in rows selection of a pixel from which the event signal is to be read and selection of a pixel from which the gradation signal is to be read at different timings.

According to the configuration described above, it is possible to read both the event signal and the gradation signal for each target pixel unit within a period of one frame.

Therefore, it is possible to realize simultaneous reading of the gradation signal and the event signal in units of frame periods.

Furthermore, in the sensor device as the embodiment, the pixel unit (20) includes one pixel (21), and generation of the gradation signal and generation of the event signal are alternatively performed on the basis of a charge generated in a light receiving element (photodiode PD) included in the pixel.

Therefore, the event signal and the gradation signal can be read in units of pixels.

Therefore, resolution of each of the event signal and the gradation signal can be increased.

Moreover, in the sensor device (1) as the embodiment, the row control unit (row control circuit 3) performs row selection for reading the event signal and row selection for reading the gradation signal for all pixel rows.

Therefore, it is possible to realize simultaneous reading of the event signal and the gradation signal in units of frame periods for all the pixel units.

Furthermore, in the sensor device (1B, 1C, 1D, 1E) as the embodiment, the row control unit (row control circuit 3B, 3C, 3D) performs row selection for reading the gradation signal on the basis of a determination result of presence or absence of occurrence of an event based on the event signal.

Therefore, it is possible not to execute reading of the gradation signal for a pixel row in which the occurrence of the event is not recognized.

Therefore, power consumption related to gradation signal reading can be reduced, and power saving of the sensor device can be achieved.

Furthermore, in the sensor device (1B, 1C) as the embodiment, the row control unit (row control circuit 3B, 3C) performs row selection for reading the event signal for all the pixel units, and performs row selection for reading the gradation signal on the basis of a determination result of presence or absence of occurrence of an event based on the event signal read by the row selection.

Therefore, it is possible to read the gradation signal only for the pixel unit in which the occurrence of the event has been recognized on the basis of the determination result of the presence or absence of the occurrence of the event for all the pixel units.

Moreover, the sensor device (1C) as the embodiment includes: a gradation output unit (gradation output circuit 5C) that outputs the gradation signal read from the pixel unit, and the gradation output unit selectively outputs the gradation signal of the pixel unit in which it is determined that an event has occurred among the gradation signals read in units of rows by row selection by the row control unit.

Therefore, it is not necessary to perform circuit operation for outputting the gradation signal at a column position where the occurrence of the event is not recognized.

Therefore, power consumption at an output stage of the gradation signal can be reduced, and power saving of the sensor device can be achieved.

Furthermore, the sensor device as the embodiment includes: a first read determination unit (event processing/output circuit 4B) that counts the number of occurrences of an event on the basis of the event signal for a unit pixel region (Rp1) including the pixel unit in a predetermined row, and determines whether or not the gradation signal can be read for the unit pixel region on the basis of the counted number of occurrences of the event (see the fifth embodiment).

Normally, an event occurs with a certain number of pixels. Therefore, in a case where the number of occurrences of an event is extremely small, for example, one, it can be estimated that the event has been erroneously detected due to noise. For this reason, by determining whether or not the gradation signal can be read on the basis of the number of occurrences of the event as described above, it is possible to prevent the gradation signal from being read for the unit pixel region in which the event has been erroneously detected due to noise.

Therefore, it is possible to prevent unnecessary reading operation of the gradation signal from being performed, and it is possible to achieve power saving of the sensor device.

Furthermore, the sensor device as the embodiment includes: a second read determination unit (event processing/output circuit 4B) that performs object recognition processing based on the event signal for a unit pixel region (Rp2) including the pixel units in a predetermined plurality of rows, and determines whether or not the gradation signal can be read for the unit pixel region on the basis of presence or absence of recognition of an object by the object recognition processing (see the sixth embodiment).

Therefore, it is possible to read the gradation signal in a case where the object has been recognized and not to read the gradation signal in a case where the object has not been recognized for the unit pixel region including the predetermined plurality of rows.

In the unit pixel region, in a case where a detection event is only an erroneous detection event due to noise, a possibility that the object is recognized in the object recognition processing is extremely low. Therefore, according to the configuration described above, it is possible to prevent the gradation signal from being read for the unit pixel region in which an event has been erroneously detected due to noise. That is, it is possible to prevent unnecessary reading operation of the gradation signal from being performed, and it is possible to achieve power saving of the sensor device.

Moreover, in the sensor device as the embodiment, the first read determination unit performs noise removal processing, which is processing of removing an event estimated to have been erroneously detected due to noise, for the unit pixel region, and determines whether or not the gradation signal can be read for the unit pixel region on the basis of the number of occurrences of the event after the noise removal processing.

Therefore, it is possible to prevent the gradation signal from being read for the unit pixel region in which the occurrence of the event has been erroneously detected due to noise.

Therefore, it is possible to prevent unnecessary reading operation of the gradation signal from being performed, and it is possible to achieve power saving of the sensor device.

Furthermore, in the sensor device (1B) as the embodiment, the row control unit (the row control circuit 3B) skips the row selection for reading the gradation signal for a row determined not to read the gradation signal (see FIGS. 22, 23, and the like).

In the row sequential selection, by skipping the row selection, an interval between selection timing of a row immediately before the skip and selection timing of a row immediately after the skip can be shortened to an interval of one row.

Therefore, time length until the gradation signals of the necessary rows are completely read can be shortened.

Furthermore, in the sensor device (1B) as the embodiment, the row control unit (the row control circuit 3B) resets a charge of a light receiving element for all rows regardless of whether or not the gradation signal is read (see FIGS. 18 to 21 and the like).

Therefore, the charge of the light receiving element can be periodically reset in a frame period.

Therefore, it is possible to prevent the charge of the light receiving element from not being reset, which adversely affects generation of the gradation signal and the event signal in another pixel, and it is possible to improve accuracy of the gradation signal and the event signal.

Moreover, in the sensor device as the embodiment, the pixel unit can generate, as the event signal, a first polarity event signal indicating a change on an increasing side of the light reception amount and a second polarity event signal indicating a change on a decreasing side of the light reception amount.

Therefore, it is possible to identify whether a generated event is an event on the increasing side or an event on the decreasing side of the light reception amount.

Figure 21:
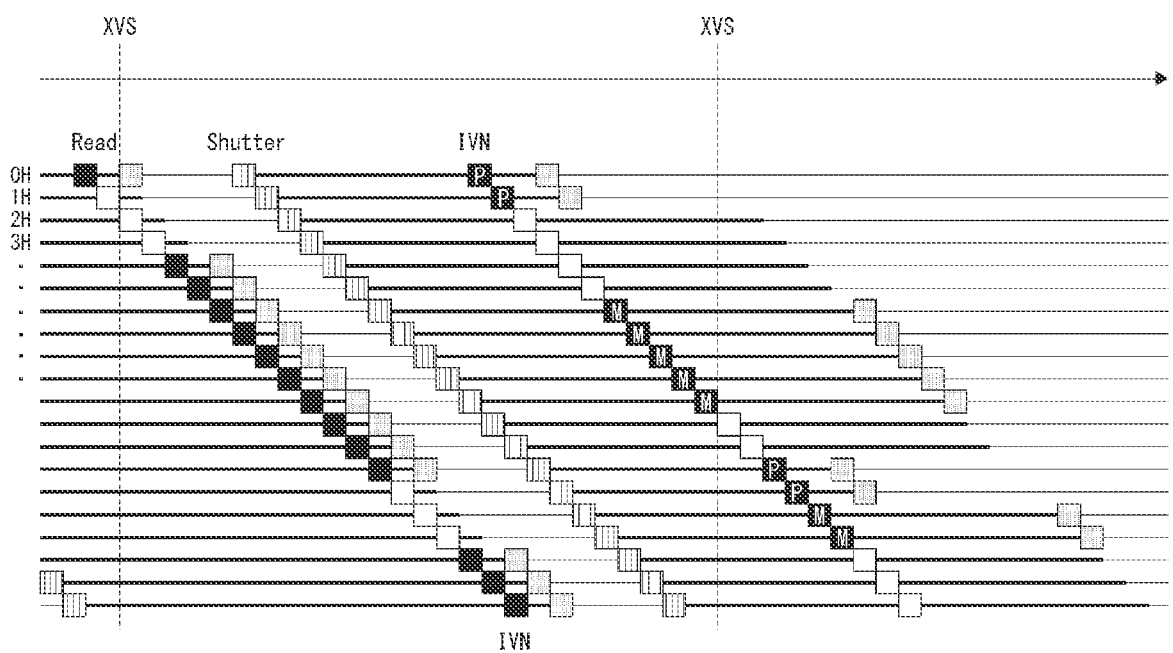
FIG. 21 is a timing chart of a modification of the example illustrated in FIG. 20.

Furthermore, in the sensor device (1B) as the embodiment, the row control unit (the row control circuit 3B) changes charge accumulation time related to generation of the gradation signal according to the polarity of the event signal (see FIGS. 20, 21, and the like).

Since the first polarity event is the event on the side in which the light reception amount increases, it is sufficient if the charge accumulation time of the gradation signal is short. Conversely, since the second polarity event is the event on the side in which the light reception amount decreases, it is desirable to increase the charge accumulation time of the gradation signal.

By changing the charge accumulation time according to the polarity of the event signal as described above, it is possible to adjust the charge accumulation time to an appropriate charge accumulation time according to the polarity of the event.

Furthermore, in the sensor device as the embodiment, the row control unit performs row selection for reading the event signal before starting charge accumulation related to generation of the gradation signal (see FIGS. 8, 10, 11, 14, 18, 20, 22, 23, and the like).

By performing the row selection for reading the event signal before starting the charge accumulation, it is possible to determine whether or not the gradation signal of the row can be read on the basis of the event signal before starting the charge accumulation.

Therefore, in a case where an event is not detected and reading of the gradation signal is not required, charge accumulation can be prevented. Therefore, circuit operation related to the charge accumulation can be omitted, and power saving of the sensor device can be achieved.

Furthermore, since it is only required to generate the gradation signal after generating the event signal within the frame period, it is preferable to a case where a configuration of the pixel unit 20 (configuration in which each pixel 21 can alternatively generate the event signal and the gradation signal) is adopted.

Moreover, in the sensor device as the embodiment, the row control unit performs row selection for reading the event signal during an execution period of charge accumulation related to generation of the gradation signal (see FIGS. 9, 10, 19, 21, and the like).

Therefore, as compared with a case where reading of the event signal is performed before starting the charge accumulation, it is possible to read the event signal at timing closer to a time point at which reading of the gradation signal is started. For example, reading of the event signal can be performed immediately before reading of the gradation signal, and the like.

Therefore, a time lag between the reading of the event signal and the reading of the gradation signal can be reduced, and accuracy of a correspondence relationship between the event signal and the gradation signal on a time axis can be improved.

Furthermore, in the sensor device as the embodiment, the row control unit starts charge accumulation related to generation of the gradation signal simultaneously for all the pixel units (see FIG. 11 and the like).

Therefore, it is not necessary to perform independent timing control in units of rows for charge accumulation of the gradation signal.

Therefore, for the row control unit, a control circuit configuration related to charge accumulation can be simplified.

Furthermore, in the sensor device (1D, 1E) as the embodiment, each of the pixel units outputs the generated event signal to the row control unit (row control circuit 3D), and the row control unit determines a row from which the gradation signal is to be read on the basis of the event signal input from each of the pixel units.

Therefore, it is possible to determine which row is to be the row from which the gradation signal is to be read before the event signals of all the pixel units are sequentially read in rows.

Moreover, in the sensor device (1D, 1E) as the embodiment, the row control unit sequentially performs row selection for reading the gradation signal in rows for the row determined to be read.

Therefore, even in a case where an event has occurred in the plurality of pixel units, the gradation signal of each of the pixel units is not read at random at each event occurrence timing, but is sequentially read in rows.

Therefore, a general gradation output circuit corresponding to row sequential reading can be used.

Furthermore, in the sensor device as the embodiment, the pixel unit (20A) includes a pixel that generates the event signal (21-I) and a pixel that generates the gradation signal (21-T).

In this case, the pixel unit generates the event signal and the gradation signal in different pixels.

Therefore, it is not necessary to alternatively generate the event signal and the gradation signal, and a degree of freedom of signal generation timing can be improved.

Furthermore, a reading method as an embodiment is a reading method in a sensor device including a pixel array unit in which a plurality of pixel units each having one or a plurality of pixels and capable of generating a gradation signal indicating intensity of a light reception amount and an event signal indicating a change in the light reception amount is two-dimensionally arranged, the reading method including: sequentially executing in rows selection of a pixel from which the event signal is to be read and selection of a pixel from which the gradation signal is to be read at different timings.

According to such a reading method as the embodiment, it is also possible to obtain functions and effects similar to those of the sensor device as the embodiment described above.

Note that the effects described in the present specification are merely examples and are not limited, and there may be other effects.

9. Present Technology

Note that the present technology can also have the following configurations.

(1)

A sensor device including:
a pixel array unit in which a plurality of pixel units each having one or a plurality of pixels and capable of generating a gradation signal indicating intensity of a light reception amount and an event signal indicating a change in the light reception amount is two-dimensionally arranged; and
a row control unit that can sequentially execute in rows selection of a pixel from which the event signal is to be read and selection of a pixel from which the gradation signal is to be read at different timings.

(2)

The sensor device according to (1),
in which the pixel unit includes one pixel, and
generation of the gradation signal and generation of the event signal are alternatively performed on the basis of a charge generated in a light receiving element included in the pixel.

(3)

The sensor device according to (1) or (2),
in which the row control unit
performs row selection for reading the event signal and row selection for reading the gradation signal for all pixel rows.

(4)

The sensor device according to (1) or (2),
in which the row control unit
performs row selection for reading the gradation signal on the basis of a determination result of presence or absence of occurrence of an event based on the event signal.

(5)

The sensor device according to (4),
in which the row control unit
performs row selection for reading the event signal for all the pixel units, and
performs row selection for reading the gradation signal on the basis of a determination result of presence or absence of occurrence of an event based on the event signal read by the row selection.

(6)

The sensor device according to any one of (1) to (5), further including:
a gradation output unit that outputs the gradation signal read from the pixel unit, in which the gradation output unit
selectively outputs the gradation signal of the pixel unit in which it is determined that an event has occurred, among the gradation signals read in units of rows by row selection by the row control unit.

(7)
The sensor device according to any one of (1) to (6), further including:
a first read determination unit that counts the number of occurrences of an event on the basis of the event signal for a unit pixel region including the pixel unit in a predetermined row, and determines whether or not the gradation signal can be read for the unit pixel region on the basis of the counted number of occurrences of the event.

(8)
The sensor device according to any one of (1) to (6), further including:
a second read determination unit that performs object recognition processing based on the event signal for a unit pixel region including the pixel units in a predetermined plurality of rows, and determines whether or not the gradation signal can be read for the unit pixel region on the basis of presence or absence of recognition of an object by the object recognition processing.

(9)
The sensor device according to (7),
in which the first read determination unit
performs noise removal processing, which is processing of removing an event estimated to have been erroneously detected due to noise, for the unit pixel region, and determines whether or not the gradation signal can be read for the unit pixel region on the basis of the number of occurrences of the event after the noise removal processing.

(10)
The sensor device according to any one of (4) to (9),
in which the row control unit
skips the row selection for reading the gradation signal for a row determined not to read the gradation signal.

(11)
The sensor device according to any one of (4) to (10),
in which the row control unit
resets a charge of a light receiving element for all rows regardless of whether or not the gradation signal is read.

(12)
The sensor device according to any one of (1) to (11),
in which the pixel unit
can generate, as the event signal, a first polarity event signal indicating a change on an increasing side of the light reception amount and a second polarity event signal indicating a change on a decreasing side of the light reception amount.

(13)
The sensor device according to (12),
in which the row control unit
changes charge accumulation time related to generation of the gradation signal according to the polarity of the event signal.

(14)
The sensor device according to any one of (1) to (13),
in which the row control unit
performs row selection for reading the event signal before starting charge accumulation related to generation of the gradation signal.

(15)
The sensor device according to any one of (1), or (3) to (13),
in which the row control unit
performs row selection for reading the event signal during an execution period of charge accumulation related to generation of the gradation signal.

(16)
The sensor device according to any one of (1) to (15),
in which the row control unit
starts charge accumulation related to generation of the gradation signal simultaneously for all the pixel units.

(17)
The sensor device according to (1),
in which each of the pixel units outputs the generated event signal to the row control unit, and
the row control unit
determines a row from which the gradation signal is to be read on the basis of the event signal input from each of the pixel units.

(18)
The sensor device according to (14),
in which the row control unit
sequentially performs row selection for reading the gradation signal in rows for the row determined to be read.

(19)
The sensor device according to any one of (1), or (3) to (18),
in which the pixel unit
includes a pixel that generates the event signal and a pixel that generates the gradation signal.

(20)
A reading method in a sensor device including a pixel array unit in which a plurality of pixel units each having one or a plurality of pixels and capable of generating a gradation signal indicating intensity of a light reception amount and an event signal indicating a change in the light reception amount is two-dimensionally arranged,
the reading method including:
sequentially executing in rows selection of a pixel from which the event signal is to be read and selection of a pixel from which the gradation signal is to be read at different timings.

REFERENCE SIGNS LIST 1, 1B, 1C, 1D, 1E Sensor device
2, 2A Pixel array unit
3, 3B, 3C, 3D Row control circuit
4, 4B, 4C, 4C' Event processing/output circuit
5, 5B, 5C Gradation output circuit
Lc, Lc1, Lc2, Lc3, Lc4, Lc5, Lc6 Row control line
Li Event vertical signal line
Lip First event vertical signal line
Lim Second event vertical signal line
Lt Gradation vertical signal line
20, 20A Pixel unit
21, 21-I, 21-T Pixel
PD Photodiode
FD Floating diffusion
Qtt Gradation transfer transistor
Qti Event transfer transistor
Qr Reset transistor
Qat Amplification transistor
Qst Gradation selection transistor
Qsip First event selection transistor
Qsim Second event selection transistor TG-T Gradation transfer drive signal
RST-T Charge reset signal
TG-I Event transfer drive signal
RST-I Reference level reset signal
SLC-T Gradation selection signal
SLC-I Event selection signal
Lref Reference level
SWr Reset switch
Vop First polarity event signal
Vom Second polarity event signal
Lrq Request signal line

The invention claimed is:

1. A sensor device, comprising:
a pixel array unit in which a plurality of pixel units, each having one or a plurality of pixels and capable of generating a gradation signal indicating intensity of a light reception amount and an event signal indicating a change in the light reception amount, is two-dimensionally arranged; and
a row control unit that sequentially executes in rows selection of a pixel from which the event signal is to be read and selection of a pixel from which the gradation signal is to be read at different timings.

2. The sensor device according to claim 1, wherein
a pixel unit of the plurality of pixel units includes one pixel, and
the generation of the gradation signal and the generation of the event signal are alternatively performed on a basis of a charge generated in a light receiving element included in the pixel.

3. The sensor device according to claim 1,
wherein the row control unit
performs row selection for reading the event signal and row selection for reading the gradation signal for all pixel rows.

4. The sensor device according to claim 1,
wherein the row control unit
performs row selection for reading the gradation signal on a basis of a determination result of presence or absence of occurrence of an event based on the event signal.

5. The sensor device according to claim 4, wherein the row control unit
performs row selection for reading the event signal for all the plurality of pixel units, and
performs row selection for reading the gradation signal on a basis of a determination result of presence or absence of occurrence of an event based on the event signal read by the row selection.

6. The sensor device according to claim 4, wherein the first read determination unit
performs noise removal processing, which is processing of removing an event estimated to have been erroneously detected due to noise, for the unit pixel region, and
determines whether or not the gradation signal is readable for the unit pixel region on a basis of the number of occurrences of the event after the noise removal processing.

7. The sensor device according to claim 1, further comprising: a second read determination unit that
performs object recognition processing based on the event signal for a unit pixel region including the plurality of pixel units in a predetermined plurality of rows, and
determines whether or not the gradation signal is readable for the unit pixel region on a basis of presence or absence of recognition of an object by the object recognition processing.

8. The sensor device according to claim 1, further comprising:
a gradation output unit that outputs the gradation signal read from the pixel unit,
wherein the gradation output unit
selectively outputs the gradation signal of the pixel unit in which it is determined that an event has occurred, among the gradation signals read in units of rows by row selection by the row control unit.

9. The sensor device according to claim 1, further comprising:
a first read determination unit that counts the number of occurrences of an event on a basis of the event signal for a unit pixel region including the pixel unit in a predetermined row, and determines whether or not the gradation signal can be read for the unit pixel region on a basis of the counted number of occurrences of the event.

10. The sensor device according to claim 1, further comprising: a first read determination unit that
counts a number of occurrences of an event on a basis of the event signal for a unit pixel region including a pixel unit of the plurality of pixel units in a predetermined row, and
determines whether or not the gradation signal is readable for the unit pixel region on a basis of the counted number of occurrences of the event.

11. The sensor device according to claim 1, further comprising: a gradation output unit that outputs the gradation signal read from a pixel unit of the plurality of pixel units, wherein
the gradation output unit selectively outputs the gradation signal of the pixel unit in which it is determined that an event has occurred, among gradation signals read in units of rows by row selection by the row control unit.

12. The sensor device according to claim 1, wherein a pixel unit of the plurality of pixel units generates, as the event signal, a first polarity event signal indicating a change on an increasing side of the light reception amount and a second polarity event signal indicating a change on a decreasing side of the light reception amount.

13. The sensor device according to claim 12, wherein the row control unit changes charge accumulation time related to the generation of the gradation signal according to a polarity of the event signal.

14. The sensor device according to claim 1, wherein the row control unit performs row selection for reading the event signal before starting charge accumulation related to the generation of the gradation signal.

15. The sensor device according to claim 1, wherein
each of the plurality of pixel units outputs the generated event signal to the row control unit, and
the row control unit determines a row from which the gradation signal is to be read on a basis of the event signal input from each of the plurality of pixel units.

16. The sensor device according to claim 1,
wherein the row control unit
performs row selection for reading the event signal during an execution period of charge accumulation related to generation of the gradation signal.

17. The sensor device according to claim 1, wherein the row control unit performs row selection for reading the event signal during an execution period of charge accumulation related to the generation of the gradation signal.

18. The sensor device according to claim 1, wherein the row control unit starts charge accumulation related to the generation of the gradation signal simultaneously for all the plurality of pixel units.

19. The sensor device according to claim 1, wherein a pixel unit of the plurality of pixel units includes a pixel that generates the event signal and a pixel that generates the gradation signal.

20. A reading method in a sensor device including a pixel array unit in which a plurality of pixel units each having one or a plurality of pixels and capable of generating a gradation signal indicating intensity of a light reception amount and an event signal indicating a change in the light reception amount is two-dimensionally arranged, the reading method comprising:

sequentially executing in rows selection of a pixel from which the event signal is to be read and selection of a pixel from which the gradation signal is to be read at different timings.

* * * * *